US012424039B2

(12) United States Patent
Clifford et al.

(10) Patent No.: US 12,424,039 B2
(45) Date of Patent: Sep. 23, 2025

(54) INTELLIGENT LOCK AND LATCH CONTROL SYSTEM

(71) Applicants: Scott Clifford, Mesa, AZ (US); Kyle Clifford, Mesa, AZ (US); Grayson Allen, Mesa, AZ (US); Kevin Hale, Mesa, AZ (US); Curtis MacKay, Mesa, AZ (US)

(72) Inventors: Scott Clifford, Mesa, AZ (US); Kyle Clifford, Mesa, AZ (US); Grayson Allen, Mesa, AZ (US); Kevin Hale, Mesa, AZ (US); Curtis MacKay, Mesa, AZ (US)

(73) Assignee: GATESENSE LLC, Mesa, AZ (US)

( * ) Notice: Subject to any disclaimer, the term of this patent is extended or adjusted under 35 U.S.C. 154(b) by 81 days.

(21) Appl. No.: 18/386,973

(22) Filed: Nov. 3, 2023

(65) Prior Publication Data

US 2024/0177551 A1 May 30, 2024

Related U.S. Application Data

(63) Continuation-in-part of application No. 17/346,611, filed on Jun. 14, 2021, now abandoned, which is a (Continued)

(51) Int. Cl.

*E05B 47/00* (2006.01)
*G07C 9/00* (2020.01)

(Continued)

(52) U.S. Cl.

CPC ..... *G07C 9/00896* (2013.01); *G07C 9/00309* (2013.01); *G07C 9/00571* (2013.01);

(Continued)

(58) Field of Classification Search

CPC ...... G07C 2009/00412; G07C 2209/62; G07C 9/00309; G07C 9/00571; G07C 9/00896; G07C 9/27; G07C 9/38; G07C 2009/00301; G07C 2009/00341; G07C 2009/00547; G07C 2009/00793; G07C 9/00817;

(Continued)

(56) References Cited

U.S. PATENT DOCUMENTS

| | | | | |
|---|---|---|---|---|
| 4,022,038 | A * | 5/1977 | Miller | E05B 47/0045 70/276 |
| 10,550,601 | B2 * | 2/2020 | Baumgarte | E05B 47/023 |
| 2004/0239460 | A1 * | 12/2004 | Kocijan | H01F 7/04 335/207 |

* cited by examiner

*Primary Examiner* — Dionne Pendleton
(74) *Attorney, Agent, or Firm* — Michael T. Wallace

(57) ABSTRACT

An ingress control system utilizes magnetic detection to determine whether the ingress control system is either allowing or disallowing ingress into a controlled area. The ingress control system includes a latch pin that is movably disposed within a latch assembly in the presence of a magnetic field. The magnetic field is created by a plurality of magnets disposed at non-zero angles relative to each other and the latch pin and latch assembly are introduced as magnetic poles disposed within the magnetic field. A magnetic sensor detects the presence of the latch pin within a receiving channel of the latch assembly by measuring a magnetic field magnitude above a threshold value. The magnetic sensor detects the absence of the latch pin within a receiving channel of the latch assembly by measuring a magnetic field magnitude below the threshold value.

14 Claims, 19 Drawing Sheets

Related U.S. Application Data continuation of application No. PCT/US2020/013759, filed on Jan. 15, 2020.

(60) Provisional application No. 62/792,601, filed on Jan. 15, 2019.

(51) Int. Cl.
*G07C 9/27* (2020.01)
*G07C 9/38* (2020.01)

(52) U.S. Cl.
CPC ................. *G07C 9/27* (2020.01); *G07C 9/38* (2020.01); *E05B 47/0012* (2013.01); *E05B 2047/0069* (2013.01); *G07C 2009/00412* (2013.01); *G07C 2209/62* (2013.01)

(58) Field of Classification Search
CPC ...... G07C 2009/00634; G07C 9/00182; G07C 9/0069; G07C 9/00912; G07C 9/22; G07C 9/28; G07C 9/33; G07C 2009/00396; G07C 2009/00761; G07C 2009/00769; G07C 2009/00849; G07C 2209/08; G07C 9/00904; E05B 2047/0069; E05B 47/0012; E05B 65/0007; E05B 2047/0095; E05B 47/026; E05B 47/0001; E05B 2047/0058; E05B 2047/002; E05B 2047/0091; E05B 47/00; E05B 2047/0067; E05B 2047/0094; E05B 45/06; E05B 2047/0068; E05B 2047/0065; E05B 2047/0048; E05B 2047/0084; E05B 2035/009; E05B 2045/069; E05B 2047/0022; E05B 2047/0072; E05B 39/00; E05B 55/12; E05B 63/0065; E05B 2047/0016; E05B 47/0676; E05B 2047/0026; E05B 2047/0059; E05B 2047/0061; E05B 2063/0091; E05B 47/0038; E05B 47/06; E05B 67/003; E05B 17/0083; E05B 19/005; E05B 2047/0017; E05B 2047/0031; E05B 2047/0082; E05B 2047/0096; E05B 41/00; E05B 43/005; E05B 47/02; E05B 47/0603; E05B 65/52; E05B 67/00; E05B 67/02; E05B 15/10; E05B 17/10; E05B 17/22; E05B 2047/0025; E05B 2047/0062; E05B 2047/0097; E05B 35/10; E05B 47/0004; E05B 65/46; E05B 71/00; E05B 13/005; E05B 13/10; E05B 15/004; E05B 15/0046; E05B 15/101; E05B 17/041; E05B 17/147; E05B 17/18; E05B 2047/0024; E05B 2047/0036; E05B 2047/0037; E05B 2047/0054; E05B 2047/0083; E05B 2047/0086; E05B 31/00; E05B 37/025; E05B 37/14; E05B 37/16; E05B 45/005; E05B 45/061; E05B 47/0002; E05B 47/0003; E05B 47/023; E05B 47/0615; E05B 47/0638; E05B 47/0642; E05B 47/068; E05B 49/00; E05B 49/006; E05B 53/00; E05B 55/00; E05B 63/0056; E05B 63/0069; E05B 63/127; E05B 63/146; E05B 65/0075; E05B 65/5238; E05B 67/063; E05B 67/22; E05B 67/28; E05B 7/00; E05B 73/0082; E05B 83/44; E05B 9/08; E05B 1/00; E05B 1/0007; E05B 1/0053; E05B 1/0084; E05B 15/0093; E05B 17/0004; E05B 17/0058; E05B 17/0062; E05B 17/0087; E05B 17/2007; E05B 17/226; E05B 19/00; E05B 2015/0235; E05B 2047/0023; E05B 2047/0035; E05B 2047/0051; E05B 2047/0052; E05B 2047/0075; E05B 35/007; E05B 35/08; E05B 39/04; E05B 47/0623; E05B 47/0661; E05B 47/0673; E05B 51/00; E05B 59/00; E05B 65/0014; E05B 65/0032; E05B 65/0035; E05B 67/36; E05B 73/0017; E05B 73/0023; E05B 83/02; E05B 9/02; E05B 9/084; E05B 2045/0665; E05B 2045/0685; E05B 47/0045; E05B 77/00; E05B 81/04; E05B 81/76; E05B 81/78; E05B 81/82; E05B 85/243; E05B 15/006; E05B 15/04; E05B 17/2011; E05B 2047/0007; E05B 47/0607; E05B 47/0657; E05B 5/003; E05B 63/121; E05B 65/0021; E05B 65/025; E05B 65/08; E05B 65/0864; E05C 1/004; E05C 1/12; E05C 3/042; E05C 1/14; E05C 9/00; E05C 3/14; E05C 3/30; E05C 9/20; E05C 1/04; E05C 3/00; H04W 4/80; H04W 12/08; H04W 52/0248; H04W 12/03; H04W 12/06; H04W 12/47; H04W 4/021; H04W 12/009; H04W 4/025; H04W 84/18; H04W 88/02; H04W 12/033; H04W 4/40; H04W 52/0209; H04W 52/0254; H04W 52/0258; H04W 12/02; H04W 12/0471; H04W 12/062; H04W 12/069; H04W 12/108; H04W 12/37; H04W 12/63; H04W 12/65; H04W 4/023; H04W 4/029; H04W 4/06; H04W 4/14; H04W 12/065; H04W 4/02; H04W 24/00; H04W 52/0277; E06B 11/02; E04H 17/017; E04H 17/013; Y10T 70/7057; Y10T 70/7593; Y10T 70/7904; Y10T 70/7006; Y10T 70/7062; Y10T 70/7113; Y10T 292/699; Y10T 70/443; Y10T 70/7068; Y10T 70/7751; H05K 2201/10598; G01D 5/145; G01B 7/24; Y02D 30/70; E05Y 2201/434; E05Y 2201/47; E05Y 2400/85; E05Y 2900/106; E05G 1/005; E05G 1/10; H04Q 1/00; G07F 7/1008; G07F 7/1025; G07F 17/12; G07F 9/10; B62H 5/20; B60R 2025/0405; B60R 2325/101; B60R 2325/103; B60R 2325/105; B60R 2325/205; B60R 25/00; B60R 25/2045; B60R 25/209; B60R 25/23; B60R 25/24; B60R 25/403; B60R 25/102
See application file for complete search history.

1500

INTELLIGENT LOCK AND LATCH CONTROL SYSTEM

CROSS-REFERENCE TO RELATED APPLICATIONS

This application is a continuation-in-part of U.S. patent application Ser. No. 17/346,611 filed Jun. 14, 2021, which is a continuation of PCT Application No. PCT/US20/13759, titled "Intelligent Lock and Latch Control System" and having a filing date of Jan. 15, 2020, which claims benefit from U.S. Provisional Application No. 62/792,601 having a filing date of Jan. 15, 2019, each of which are incorporated herein by reference.

TECHNICAL FIELD

The present specification relates to a lock and latch control system, and more particularly to an intelligent lock and latch control system for alerting a user and securing a gate door.

BACKGROUND

Various types of locks or locking mechanisms have been developed for locking gates, fences, pool fences, barn doors, cattle gates, and storage units. Gate locks typically consist of a gravity latch, gravity latch housing, and a keeper pin wherein the bolt may activate the gravity latch when the gate or fence is closed, depressing the gravity latching mechanism, which is pivotally mounted onto the gravity latch housing, and then enclosing a portion of the keeper pin, locking the gate onto a stationary fence pole. The gravity latch may be locked into the gravity latch housing by attaching a padlock, or combination lock through a hole on the bottom portion of the gravity latch housing. However, if a padlock is not attached to the gravity latch housing, then the gravity latch may be easily opened.

U.S. Pat. No. 8,376,421 shows a magnetic gate latching device mounted to a fence post including a latch assembly, and a keeper assembly to control access to a pool area. The magnetic gate latching device's upper latch may include an actuator coupled to a lower latch assembly, and the upper latch actuator may include an actuator pull knob member which may provide a visual indication of the position of the lower latch. The keeper assembly may include a latch base which may have a latch arm which may be attached to a gate. The latch arm may have a latch pin recess configured to receive the latch pin and a magnet recess to retain a vertically disposed magnet. Typically, a homeowner, business owner or other gate user chooses a gate locking system that will keep a pool gate, side gate, cattle gate, or barn door shut and locked. These types of gate-locking systems are waterproof, and usually made from high strength material that may resist the elements and which may be simply operated in connection with a padlock or dial lock to protect the contents. All these locks have a mechanical element to keep the gate or door shut but require an additional element to lock it. In addition, current gate locking systems require the user to visually check the status of the gate and whether it has been shut, or if someone has tampered with the gate. If the user is not at home, then there is no way of providing feedback from these gate locking systems.

It would be advantageous to provide an intelligent lock and latch control system that enables a user to be connected to their gate, is waterproof, locks the gate, and may inform the user of the status of the gate from remote locations.

SUMMARY

To overcome limitations in the prior art, and to overcome other limitations that will become apparent upon reading and understanding the present specification, various embodiments of the present invention disclose methods and apparatus for accurate reporting of the position of a first ferromagnetic object that varies with respect to a second ferromagnetic object where both the first and second ferromagnetic objects are disposed in the presence of a magnetic field. Such ferromagnetic objects may exist within a latching system of a gate, door or other ingress prevention device such as a pool gate whereby the reliable reporting of the status of the gate or door (e.g., whether the gate is open or closed) is crucial to the safe operation of the area being protected. As per an example, a pool gate designed to prevent unauthorized ingress of children into a pool area is made to be safer when the status of the pool gate is accurately reported to be open when the pool gate is actually open and is further accurately reported to be closed when the pool gate is actually closed. As such, the owner of the pool area can be assured that improper ingress into the pool area is being prevented when the owner receives highly reliable pool gate status to that effect.

In accordance with one embodiment of the invention, a latch system comprises a latch assembly configured to include a receiving channel, a latch pin removably disposed within the receiving channel, at least two magnets disposed at non-zero angles relative to each other, the at least two magnets being configured to generate a magnetic field in proximity to the latch assembly, the latch pin and the receiving channel and a sensor configured to measure a magnitude of the magnetic field. The magnitude exceeds a threshold value only when the latch pin is disposed within the receiving channel.

In accordance with another embodiment of the invention, a method of operating a latch system comprises disposing a first and second magnet in proximity to a receiving channel of a latch assembly, where the first and second magnets are arranged at non-zero angles relative to each other, moving a latch pin to a first location inside the receiving channel, moving the latch pin to a second location outside the receiving channel and measuring a magnetic field in proximity to the receiving channel. The measured magnetic field exceeds a threshold value only when the latch pin is in the first location.

In accordance with another embodiment of the invention, a latch system comprises a latch assembly configured to include a receiving channel, a latch pin removably disposed within the receiving channel, at least two magnets disposed at non-zero angles relative to each other and configured to generate a magnetic field in proximity to the latch assembly, the latch pin and the receiving channel and a sensor configured to measure a magnitude of the magnetic field. The magnitude exceeds a threshold value only when the latch pin is disposed within the receiving channel. The latch system further comprises a processor configured to receive a signal from the sensor, the signal indicating that the measured magnitude exceeds the threshold value and a wireless module coupled to the processor and configured to transmit the signal.

BRIEF DESCRIPTION OF THE DRAWINGS

These and other features, aspects, and advantages of the present specification will become better understood with regard to the following description, appended claims, and accompanying drawings where:

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
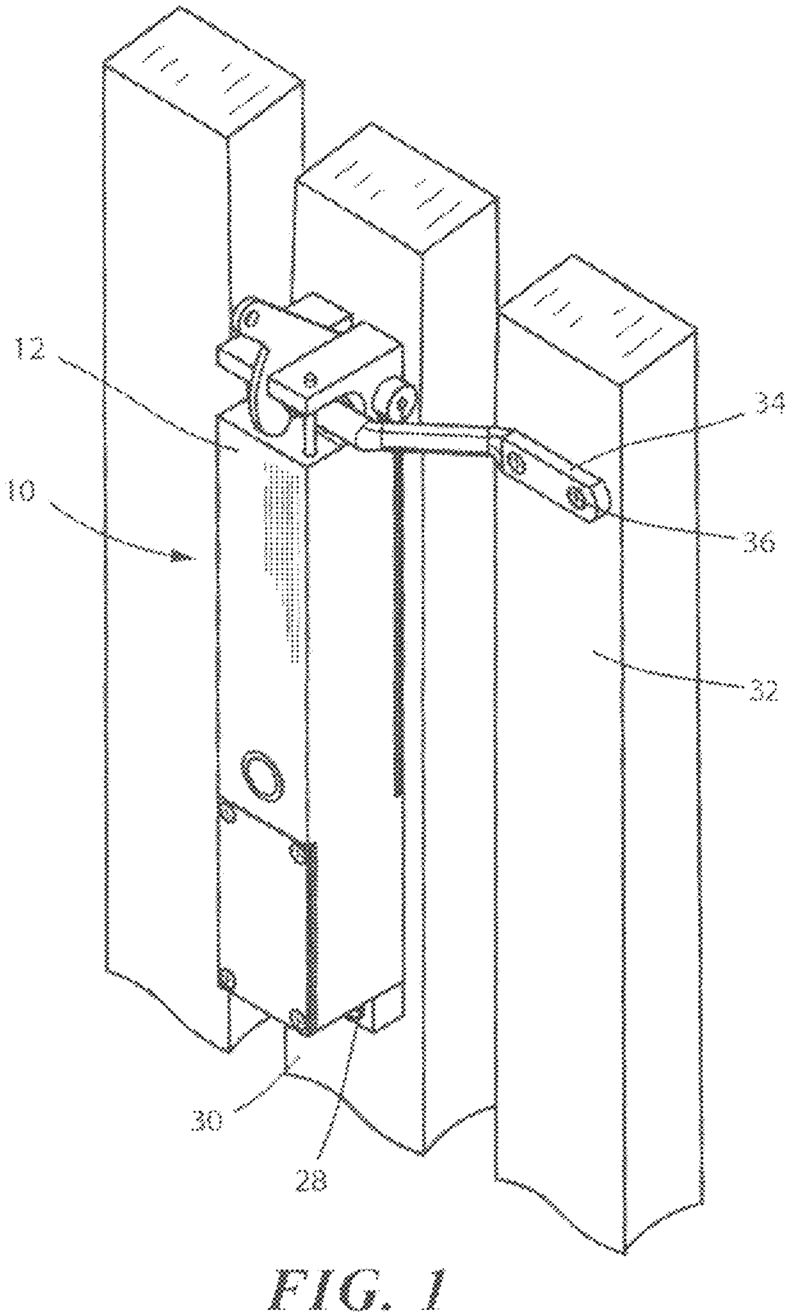
FIG. 1 is a front-isometric view of an intelligent lock and latch system in accordance with one or more embodiments.

Referring initially to FIG. 1, an isometric view of an intelligent lock and latch system is shown generally at 10. The intelligent lock and latch system 10 may comprise a housing 12 wherein the housing 12 may be coupled with a housing plurality of fasteners 28 to a post 30. The post 30 may be such as, but not limited to, a barn wall, cattle gate, a pool gate, farm gate, side yard gate, and the like. The intelligent lock and latch system 10 may further comprise a latch pin 34 wherein the latch pin may be coupled to a gate 32 by a gate plurality of fasteners 36, wherein the gate 32 may be such as, for example, swinging gate, barn door, cattle gate, pool gate, fence gate, construction post, farm gate post, or the like. The latch pin 34 may be such as, for example, gate latch, barn door latch, pool latch, sliding latch, hook and eye latch, flip latch, or the like. The gate and housing fasteners 28, 36 may be such as, for example, bolts, screws, rivets, anchors, or the like.

Figure 9:
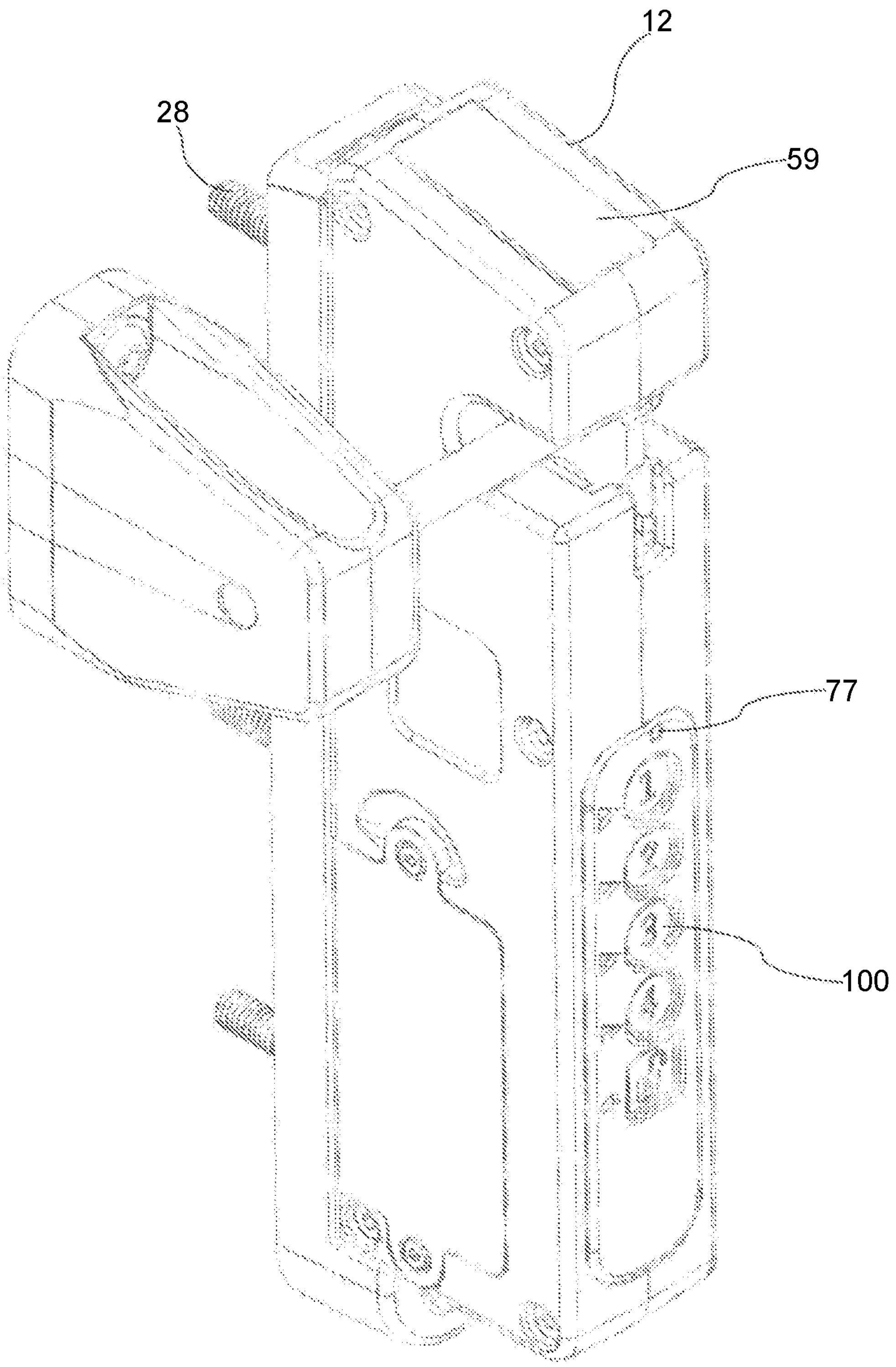
FIG. 9 is an isometric view of an assembled keypad embodiment of an intelligent lock and latch system in accordance with one or more embodiments.
Figure 10:
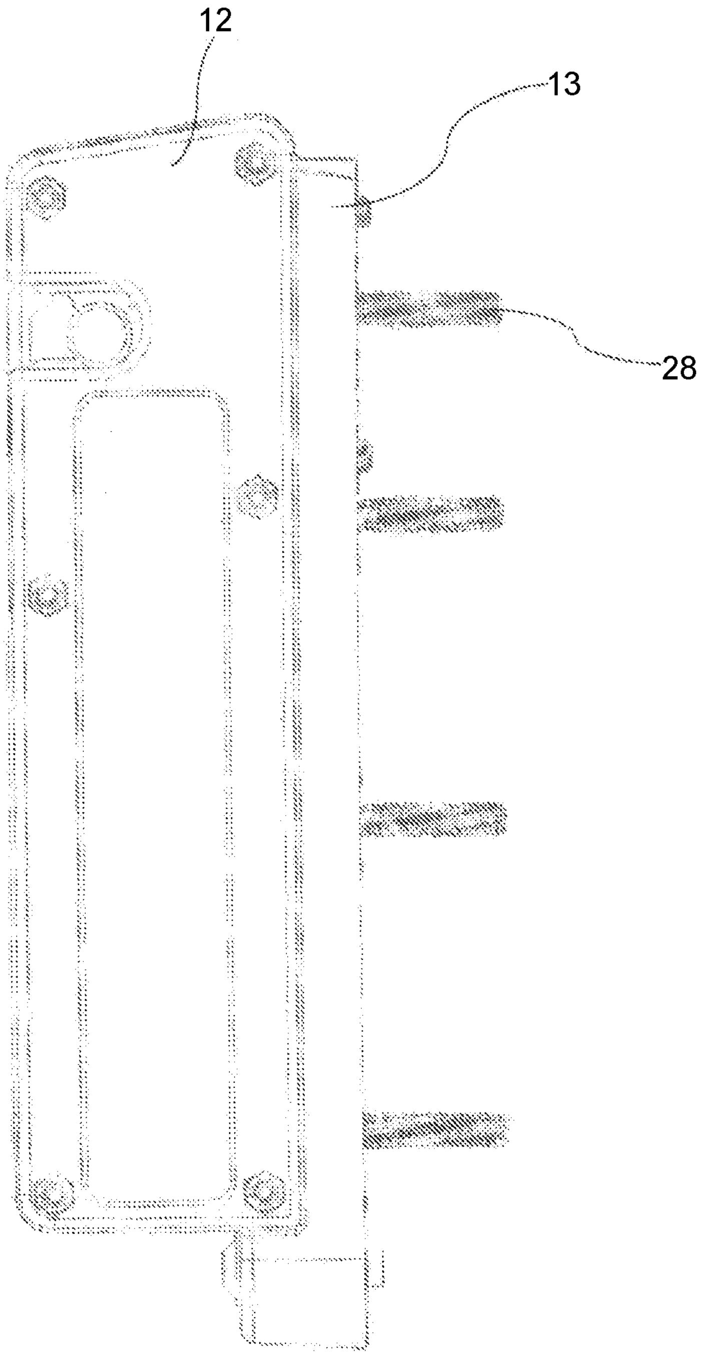
FIG. 10 is a side view of the embodiment of FIG. 9.
Figure 11:
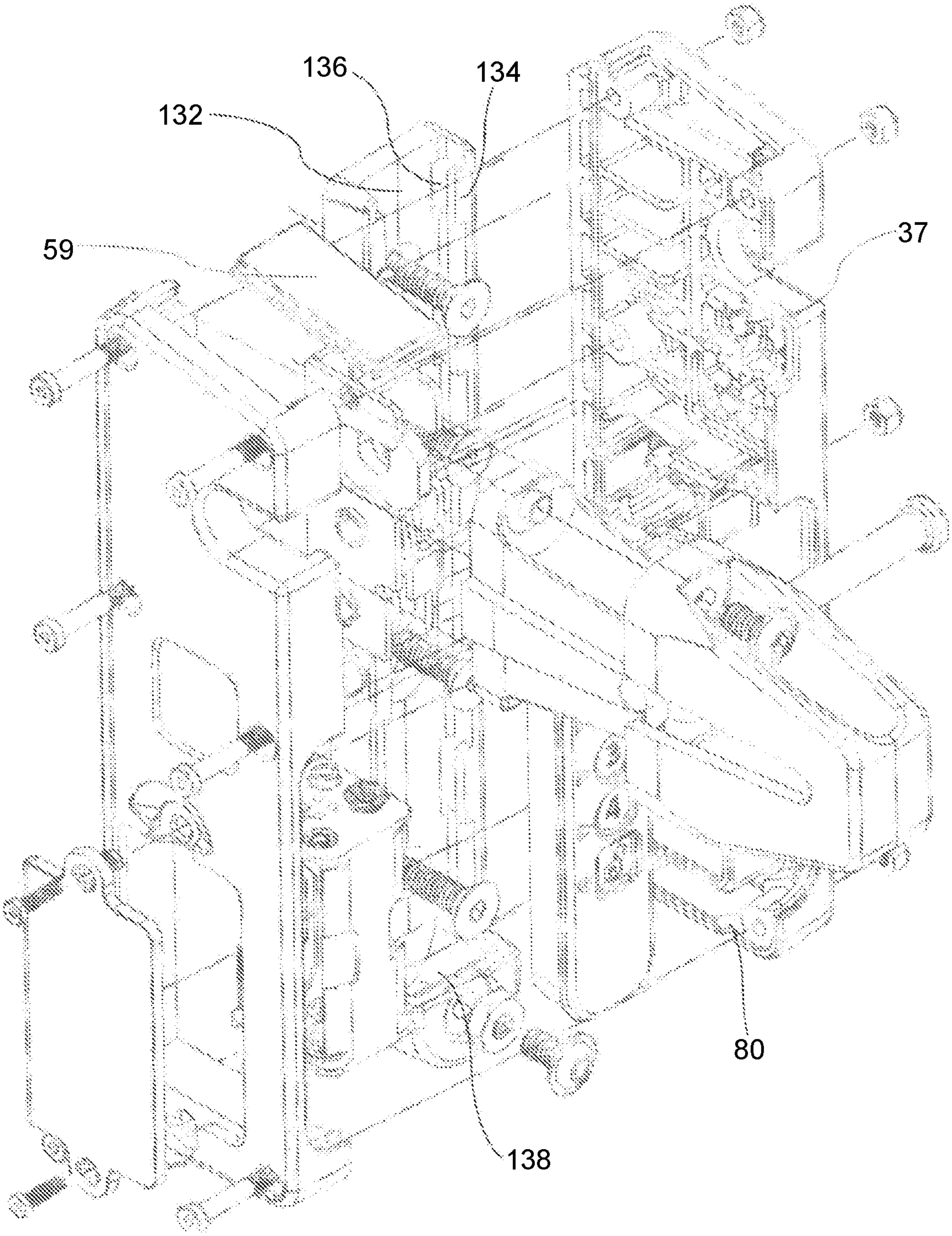
FIG. 11 is an exploded isometric view of the embodiment of FIG. 9.

In some embodiments, the intelligent lock and latch system 10 may be attached to a post 30 by an adapter mount 13, best shown in FIGS. 9-11. The adapter mount 13 is first attached to the post 30 by a plurality of fasteners 28. The housing 12 is then attached to the adapter mount 13. The housing 12 may couple to the adapter mount 13 by use of a channel 132 and at least one wall 134. The housing 12 includes a plate 122 that is configured to fit into the channel 132 such that the walls 134 secure the plate 122 to the adapter mount 13. The plate 122 may have a "T" shape that fits into side slots 136 of the channel 132. The plate 122 may be mechanically coupled to or integral to the housing 12. The "T" plate 122 slides into the channel 132 until it rests on a base 138 to quickly and securely connect the housing 12 to the adapter mount 13.

Referring to FIGS. 2A-2D, the housing 12 may further comprise a front cavity 14, a back cavity 16, one or more mounting holes 20, a slot 26, and a recess 18. The housing 12 may be manufactured from plastics such as, for example, polyethylene terephthalate, high-density polyethylene, polyvinyl chloride, polypropylene, polylactic acid, nylon or the like, and/or metals such as, for example, stainless steel, aluminum, Inconel, carbon steel, or the like. The housing 12 may be a rectangular shape, or it may be circular, square, hexagonal, or the like in shape, and may have one or more cavities which may include one or more of the back cavity 12 and the front cavity 13. The housing 12 may be machined from a blank piece of material, or it may be injected molded, or casted.

The front cavity 14 may be at or near the bottom of the housing 12 wherein the front cavity may store a power supply wherein the power supply may be a plurality of batteries 58. The front cavity 12 may be sized to accommodate various types of battery 58 sizes such as, small coin cell batteries to large lithium-ion batteries. The batteries 58 may be placed into a sleeve which may be placed into the front cavity 14, or the batteries may freely float within the front cavity. The front cavity 14 may have one or more attachment points 51 at or near the outside edges to which one or more fasteners 50 may be used to attach a front cover 48. The front cavity 14 may be rectangular, circular, square, hexagonal or the like in shape. In certain embodiments, the front cavity 14 may be omitted from the housing, or it may be placed on the back of the housing. The batteries 58 may be rechargeable, or replaceable, and may be such as, for example, nickel cadmium, nickel metal hydride, lithium ion, alkaline, nickel-zinc, or the like.

The front cover 48 may be attached to the front cavity 14 with one or more fasteners 50, and a front seal 52 may be placed between and/or compressed between the front cover, the housing 12 and the perimeter of the front cavity. The front cover 48, front seal 52, and front cavity 12 when attached together with fasteners 50 may keep fluids and dust from penetrating and entering the front cavity. The front seal 52 may be such as, for example, a gasket, O-ring, elastomeric over molding, ultra-sonic welded, or the like. The front seal 52 may be removably or permanently attached to the housing 12, or the front cover 48, and may have a substantially similar shape as the front cavity 14. The front cover 48 may be manufactured from the same or similar materials and process as the housing 12.

The housing 12 may be coupled to the post 30 by one or more fasteners 28 through the housing's mounting holes 20 (as shown in FIG. 1). The mounting holes 20 may be located near the top and the bottom of the housing 12 wherein the bottom mounting holes may be exposed, or in some embodiments may be encapsulated within the front cavity 14. The mounting holes 20 located substantially near the top of the housing may be within the recess 18 or have a flange that extends beyond the top of the housing for the mounting holes 20 wherein the fasteners 28 may be inserted into and attached to the latch post 30 (as shown in FIG. 1). In some embodiments, the mounting holes 20 and the fasteners 28 near the top and bottom of the housing 12 may be enclosed with a cover or encapsulated within the housing cavities. The fasteners 28 may be such as, for example, screws, bolts, rivets, pins, nails, carriage bolts, or the like.

The recess 18 may be substantially near the top of the housing 12 and may have a top and a bottom surface with a radius being substantially larger diameter as the latch pin 34 wherein the latch pin may slide into the recess and may be locked into position by a gravity latch 54. The recess 18 may have a bottom surface, a top surface and a sensor cavity 37 for a sensor 38 to attach to, which may monitor the location of the latch pin 34. The latch pin 34 may have a magnet 39 attached to it which may activate the sensor when it is in close proximity allowing the user to know whether the latch pin is in an open or closed state. In other embodiments, the magnet may be omitted and the latch pin 34 may have a surface wherein a sensor such as a proximity sensor may read a return signal from the latch pin. The sensor cavity 37 may be substantially at or near the top or bottom of the recess, and substantially near the back of the recess 18. In certain embodiments, the sensor 38 may be placed in the back cavity, and the magnet may be on or in a locking pin 66, and or a gear 64 monitoring the distance traveled, and state of the locking pin. The sensor 38 may be such as, for example, hall effect sensor, infrared, capacitive, photoelectric, proximity, inductive, or the like. The recess 18 may have the locking pin hole 24 located on its bottom surface which may be a thru hole to the back cavity 16, wherein the locking pin hole may allow a locking pin 66 to trap, and/or lock the locking pin into the recess. The locking pin hole 24 may be sized to allow the locking pin 66 to slide up and down in the locking pin hole wherein the locking pin may be such as, for example, between 0.0625 inches and 0.250 inches, more preferably a width of between 0.09375 inches and 0.1875 inches, and still more preferably a width of approximately 0.125 inches or the like.

The slot 26 may extend from the top of the housing 12 to the recess 18 wherein the slot may be sized to accommodate a gravity latch 54 wherein the gravity latch may move freely up and down to release or trap the latch pin 34 within the recess. The gravity latch 54 may pivot on a pivot pin 56 which may be attached to and/or connected to the housing 12 through a support pin hole 68. The pivot pin 56 may be for example, a dowel pin, a bolt, a slotted pin, a coiled pin, a shoulder bolt, or the like which the support pin hole 68 may be sized to be an interference fit, clearance fit, or transition fit for the pivot pin 56 wherein if the fit is loose the support pin may either screw into one side of the housing, or the support pin may have a bolt and nut combination or the housing may be threaded, or the support pin may have clamps on the end locking the support pin in place. The support pin hole 68 may be such as, for example, between 0.0625 inches and 0.250 inches, more preferably a width of between 0.09375 inches and 0.1875 inches, and still more preferably a width of approximately 0.125 inches or the like. In certain embodiments, a housing 12 may fit around an existing latch 34 or may be installed on an existing latch wherein the housing may have a slot or recess that may slide over or may be placed around the latch allowing the latch to remain attached to the gate and allowing the housing to be fastened to the gate or fence over the current latch system.

The housing 12 may further comprise a push button hole 22 wherein the push button hole may be on the front surface of the housing. The push button hole 22 may be sized to accommodate a push button 60 wherein the push button may be such as, for example, a momentary switch, toggle switch, selector switch, proximity switch, pressure switch, or the like. The push button may be controlled by the user wherein when it is pushed it may activate a motor 62 (e.g., as discussed below in relation to motor 1520 of FIG. 15), and the gears 64 may move the locking pin 66. In an alternative embodiment, the motor 62 may engage a cam 65 (e.g., as discussed below in relation to cam 1408 of FIG. 14) to move the locking pin 66. The user may set the time window or limit the time of use within a mobile application or computing device wherein the push button may be active, when outside of the time window the push will not activate the motor 62 and gears 64. In some embodiments, the push button 60 and the push button hole 22 may be omitted and the push button may be replaced with radio-frequency identification (RFID), Bluetooth Low Energy, Wi-Fi, near-field communication, or the like (e.g., as discussed below in relation to wireless network 1514 of FIG. 15).

The back cavity 16 may comprise a motor mount 63, one or more gear supports 69, and an electronic mount 76. The back cavity 16 may be on the back of the housing 12 and extend from just below the recess 18 to just above the front cavity 14 wherein the back cavity and front cavity may be two separate compartments, or the cavities may be one large compartment, or two or more compartments. In certain embodiments, the back cavity 16 may be omitted and may be on the front of the housing 12. A motor 62 may be attached to or connected to the motor mount 63 by one or more fasteners, or it may snap onto the motor mount. The motor's 62 shaft may be connected to one of the gears 64. The motor 62 may be such as, for example, DC motor, step motor, brushless motor, brushed motor, AC motor, synchronous, asynchronous, or the like. The one or more gears 64 may be a gear reduction system wherein the gears may reduce the motor's rotation per second by such as, for example, 1:1, 2:1, 3:1, 4:1, 5:1, 10:1, 20:1, 30:1 or the like. In some embodiments, the motor 62 may have an internal gear reduction system or may be a magnetic motor/mechanism that lifts, lowers and locks the locking pin 66 in place. The gears 64 may be placed on, and/or supported by one or more gear supports 69 wherein the gear supports may hold the gears in place and allow the gears to rotate freely as the motor turns the gears. The gears 54 may be such as, for example, 30 teeth, 35 teeth, 40 teeth, 45 teeth, 50 teeth, 55 teeth, 60 teeth, 65 teeth, 70 teeth, or the like and may be single deck gear, double deck gear, helical gear, bevel gear, worm gear, spur gear or the like.

The locking pin 66 may be attached to one of the gears 64 by a locking pin adapter 65 which may lock the pin onto the gear wherein the motor 62 may turn the gears activating the locking pin through the locking pin hole 24 and locking or trapping the latch pin 34 within the recess. The locking pin 66 and the locking pin hole 24 may be sealed with a locking pin seal (not shown) wherein the locking pin seal may keep fluids and dust from penetrating the inside of the housing. The locking pin may be such as, for example, a dowel pin, a pin, threaded rod, metal rod, shafts, plastic rods, or the like. The locking pin seal (not shown) may be such as, for example, O-ring seal, gasket seal, ring seal, grommet, sealing washer, or the like. The locking pin 66 may be manufactured from materials such as, for example, stainless steel, aluminum, carbon steel, or the like, or plastic materials such as polyethylene terephthalate, high-density polyethylene, polypropylene, acrylonitrile butadiene styrene, or the like. In certain embodiments, the locking pin 66 may be locked into place with a dial lock, padlock or the like, or other embodiments the locking pin may be omitted and the latch pin 34 may be locked or trapped onto the housing 12 with an on/off magnet and magnetic switch within the housing and the latch pin or may be locked into place with two or more locking pins 66. In another embodiment, the locking pin 66 may be locked into place by a linear solenoid with a rod wherein the solenoid may trap the gear and/or locking pin in its open or closed state.

The intelligent lock and latch system 10 may further comprise a back cover 40 wherein the back cover may comprise of back cover gear supports 42 and fastener holes, wherein the back cover gear supports may mate up with and/or connect to the gear supports 69 within the housing 12. In some embodiments, the back cover gear supports 42 may be omitted from the back cover 40. The back cover 40 may be connected to the housing 12 by one or more back cover fasteners 44 and the back cover may have a back seal 46 placed between itself and the housing to keep fluids from getting into the back cavity. The back cover seal 46 may be made from the same materials and properties as the front cover seal 52. The back seal 52 may be removably or permanently attached to the housing 12, or the back cover 40, and may have a substantially similar shape as the back cavity 16. The back cover fasteners 44 may be such as, for example, bolts, screws, rivets, or the like.

An electrical system 70 (e.g., as discussed below in relation to latch system controller 1500 of FIG. 15) may be attached to the electrical support 76 wherein the electrical support may be part of the back cavity 16 within the housing's 12 mold or may be a separate piece that may be attached through fasteners to the housing 12. The electrical system 70 may comprise, but is not limited to, a power source such as a battery 58 (e.g., as discussed below in relation to power supply 1502 of FIG. 15) or a solar panel 59 (e.g., as discussed below in relation to recharge circuit 1524 of FIG. 15), a printed circuit board 74 ("PCB"), microcontroller ("MCU") (e.g., as discussed below in relation to processor 1504 of FIG. 15), Bluetooth module (e.g., as discussed below in relation to wireless module 1508 of FIG. 15), an H-bridge, a memory module (e.g., as discussed below in relation to memory 1506 of FIG. 15), and an RF-transmitter/receiver (e.g., as discussed below in relation to wireless module 1508 of FIG. 15). In some embodiments, the electrical system 70 may comprise an accelerometer, temperature sensor, humidity sensor, atmospheric sensor, or the like (e.g., as discussed below in relation to I/O Devices 1512 of FIG. 15). The electrical system 70 may transmit updates and notifications to the user or to a home hub and may receive updates to the firmware that may exist within a memory module (e.g., as discussed below in relation to memory 1506 FIG. 15). The electrical system 70 may connect directly to a home hub or to a mobile device (e.g., as discussed below in relation to remove device 1526 of FIG. 15) which may have a mobile application on it that may receive notifications from the home hub or directly from the electrical system itself via wireless communications (e.g., as discussed below in relation wireless network 1514 of FIG. 15). The RF transmitter/receiver may communicate with a home hub or a mobile device. The notifications that the electrical system 70 may send to the user are, for example, history of gate openings, status of gate such as whether it is open or closed or when the gate was open and not shut, who has accessed the gate, whether the gate was disturbed, or the like.

Figure 2A:
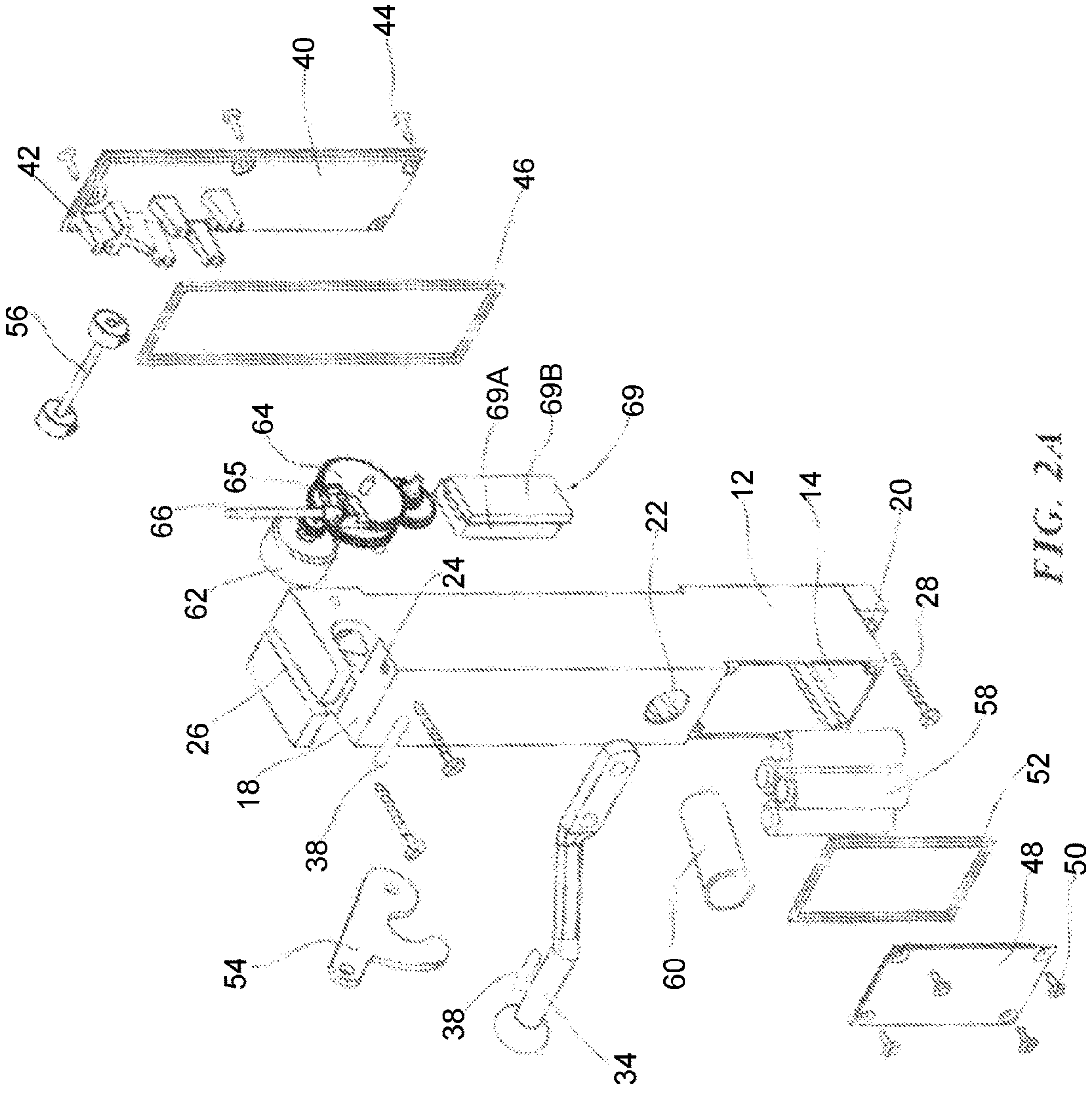
FIG. 2A is a front-isometric exploded view of an intelligent lock and latch system in accordance with one or more embodiments.
Figure 2B:
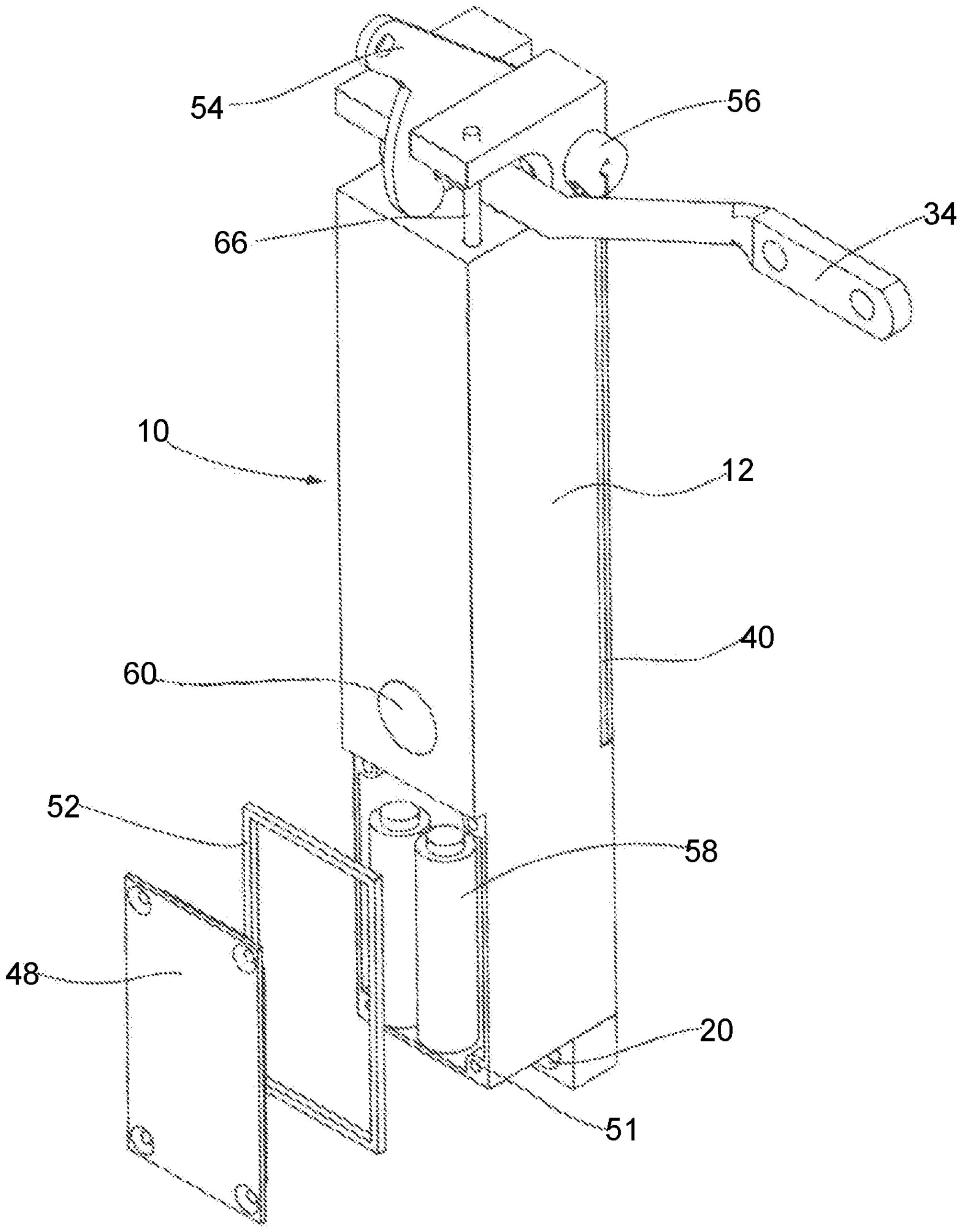
FIG. 2B is a front-isometric exploded view of an intelligent lock and latch system in accordance with one or more embodiments.
Figure 2C:
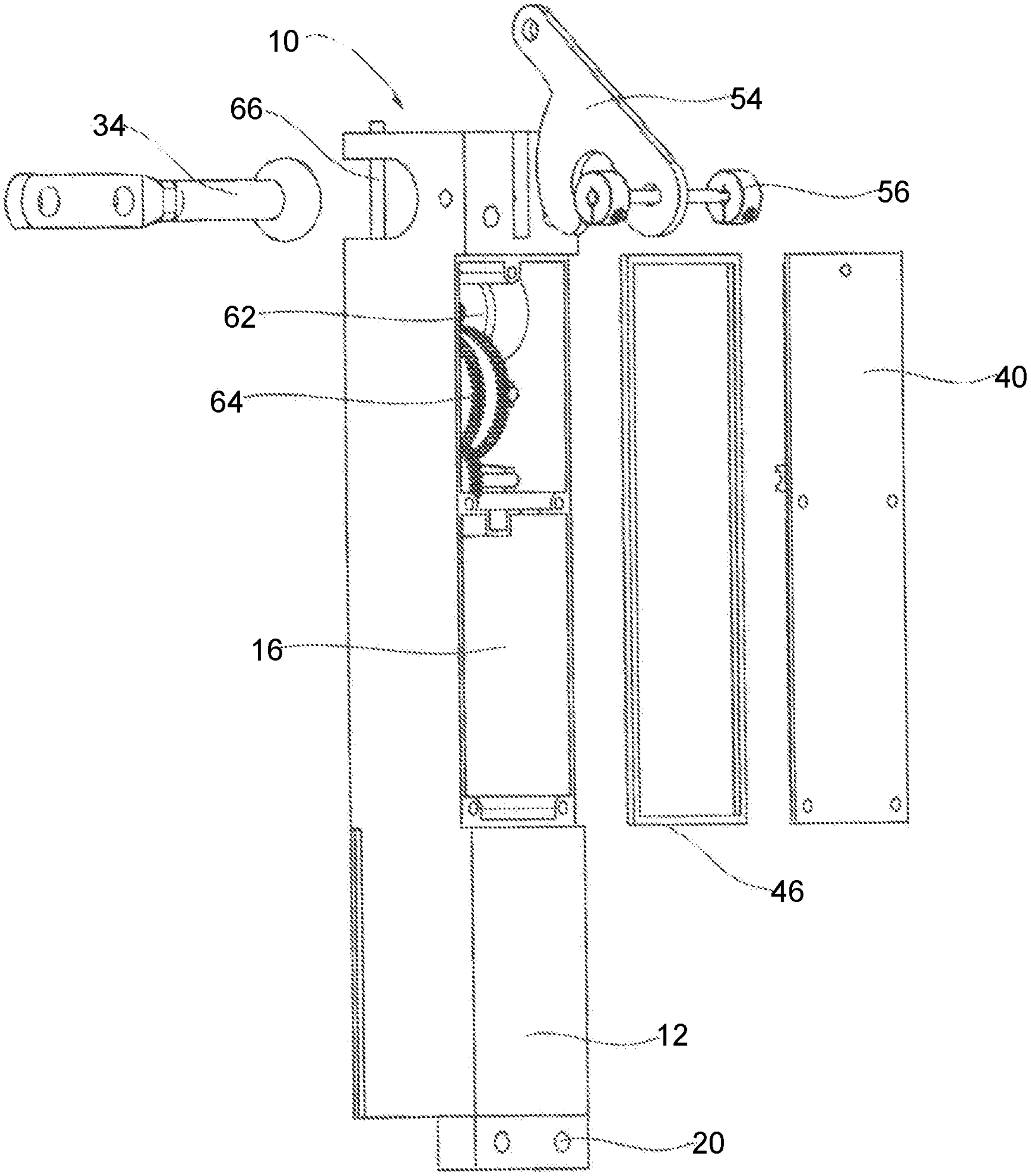
FIG. 2C is a back-isometric exploded view of an intelligent lock and latch system in accordance with one or more embodiments.
Figure 2D:
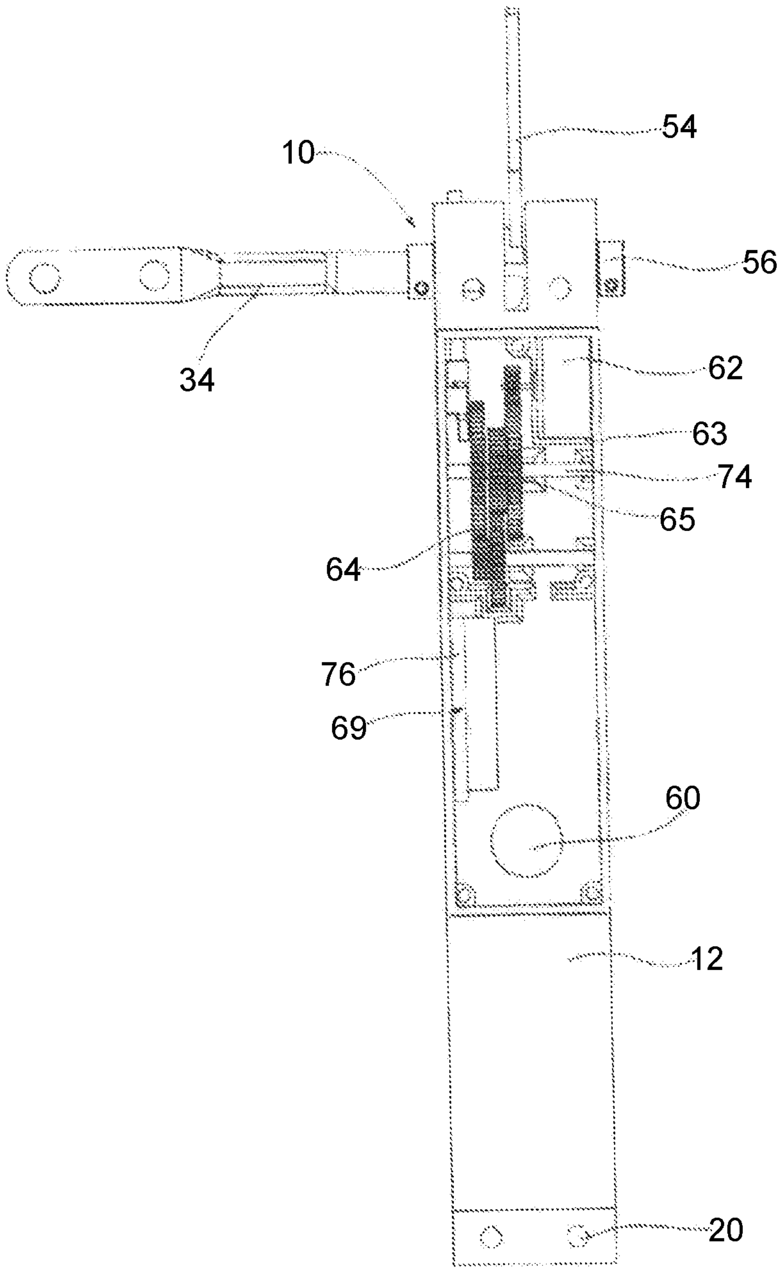
FIG. 2D is a back view with back cover omitted of an intelligent lock and latch system in accordance with one or more embodiments.
Figure 3:
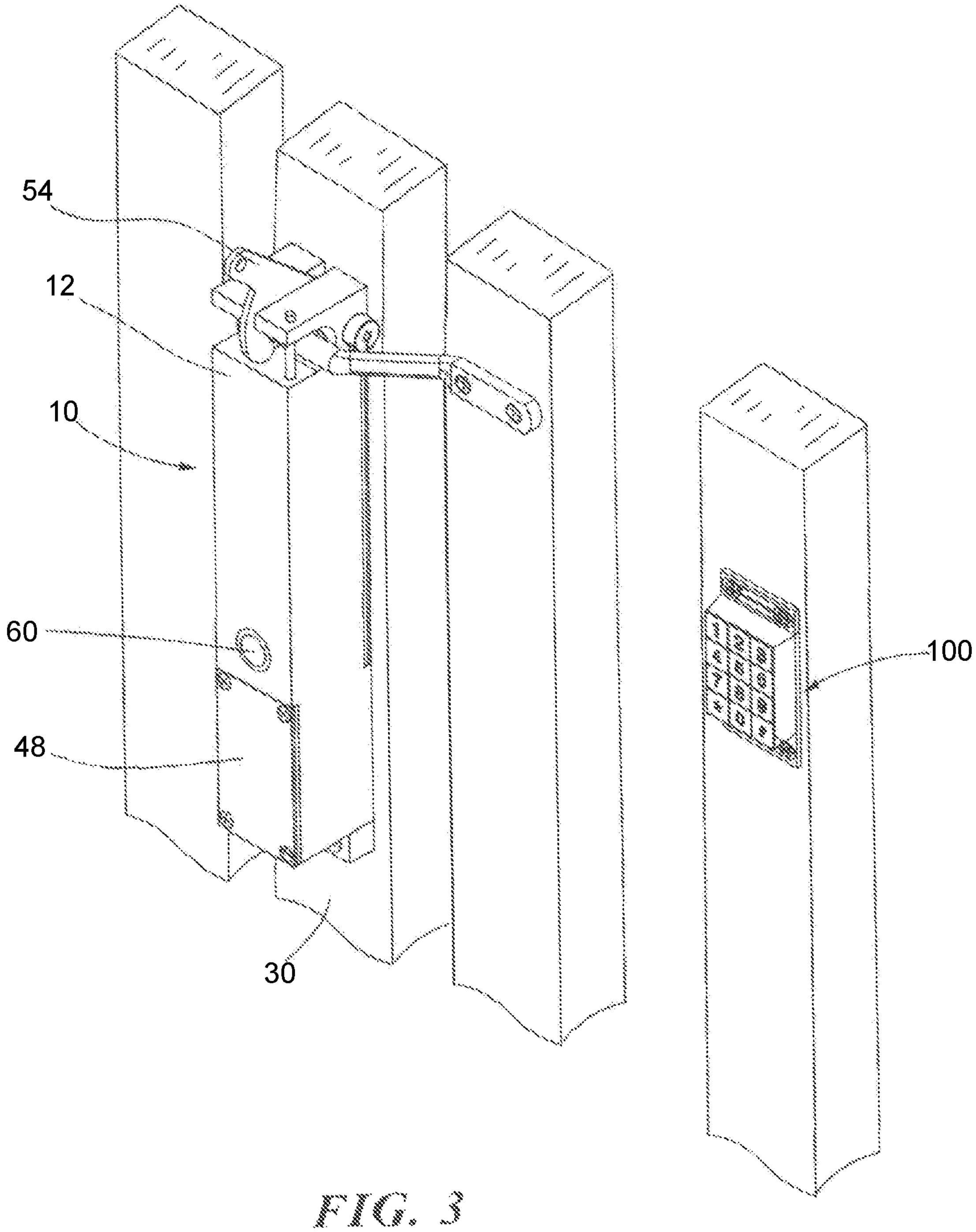
FIG. 3 is an isometric view of an intelligent lock and latch system and keypad in accordance with one or more embodiments.

Referring to FIGS. 3 and 9, the intelligent lock and latch system 10 may further comprise a keypad 100 wherein the keypad may be a standalone system that may communicate through wireless communication (e.g., as discussed below in relation to wireless network 1514 of FIG. 15) to the electronics within the intelligent lock and latch system. The keypad 100 may communicate to the intelligent lock and latch system 10 through such as, for example, Bluetooth Low Energy, Wi-Fi, Bluetooth, or RF-transmitter/receiver, infrared, the like or conversely may communicate via wired communications (e.g., as discussed below in relation to wired communication channel 1528 of FIG. 15). The keypad 100 may have such as, for example, a digital keypad, an analog keypad, membrane keypad, capacitive keypad, dome-switch keypad, or the like. The keypad 100 may be powered by a battery having the same properties as the intelligent lock and latch system battery 58 (as shown in FIG. 2B) and/or by the solar panel 59. The keypad 100 may be attached to a post 30, or a gate 32 by one or more fasteners. In some embodiments, the keypad 100 may have its own electronics that may store the code, and in other embodiments the keypad may be omitted from the system.

Figure 4:
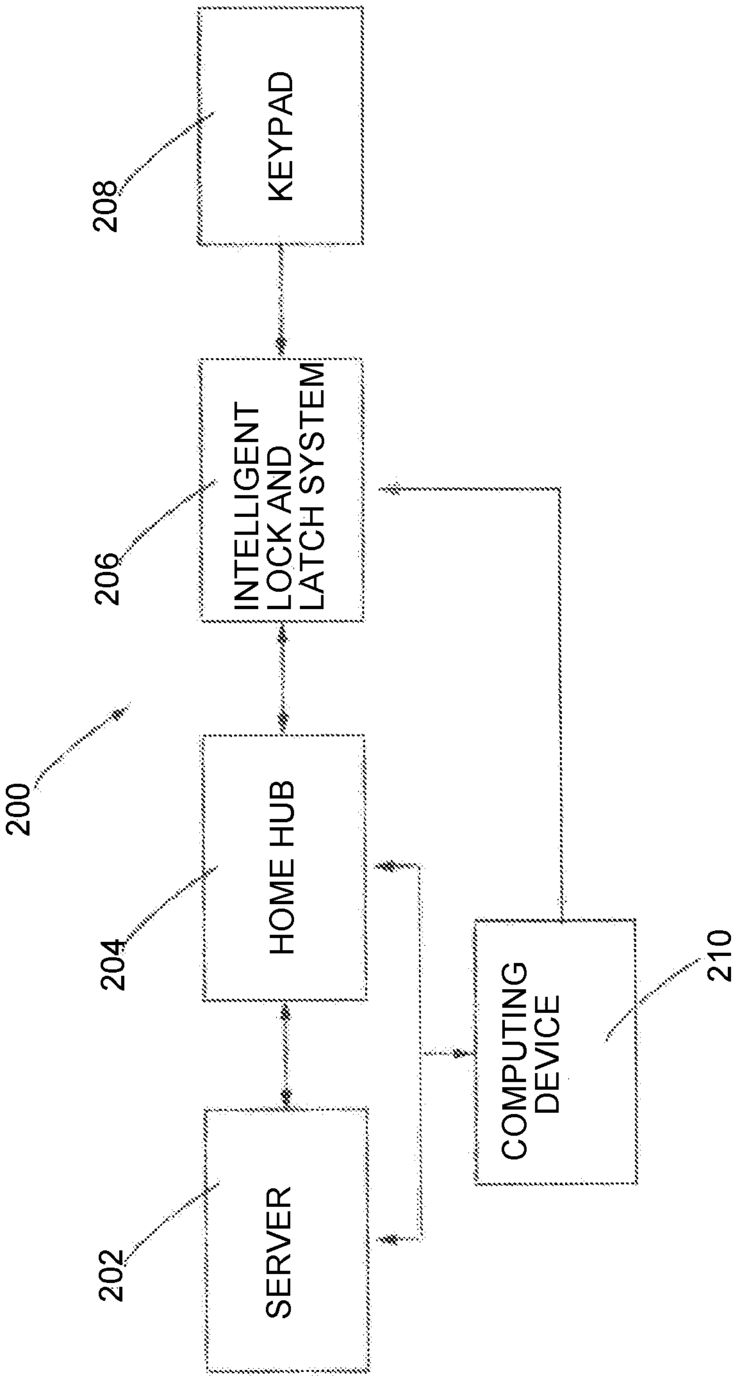
FIG. 4 is a flow diagram of an intelligent lock and latch system and communicating remotely to a user in accordance with one or more embodiments.

Referring to FIG. 4, a flow diagram of an intelligent lock and latch system shown generally at 200. At 208, a user may input a code into a keypad wherein the code may be multi-digit code that may be stored on the intelligent lock and latch system, or it may be stored on the home hub (e.g., as discussed below in relation to remote device 1526 of FIG. 15). A user may set or update the code on a computing device 210 wherein the computing device may have a mobile application installed on it that may be programmed to send the set or updated code to the intelligent lock and latch system or the home hub 204. The intelligent lock and latch system 206 may communicate with the home hub 204 with a wireless communication module such as, for example, RF-radio, Bluetooth module, Bluetooth Low Energy, Wi-Fi, or the like (e.g., as discussed below in relation to wireless network 1514 of FIG. 15). The home hub 204 may receive the wireless communications from the intelligent lock and latch system 206 and/or the computing device 210. The home hub 204 may be plugged into a conventional 110V or 220V wall outlet.

The home hub 204 may comprise a microcontroller or a microcomputer that may either wirelessly communicate to a server 202 or be hard wired to the server. The home hub 204 may receive the data from a computing device 210 or the server 202 which may receive its data from a computing device. The home hub 204 may be the connection point with the user using the mobile application on a computing device 210. The home hub 204 may communicate with and send commands to the intelligent lock and latch system 206 wherein the intelligent lock and latch system does not need to store any information on the system itself. In other embodiments, the intelligent lock and latch system 206 may store the commands and send the notifications to the home hub 204, and in other embodiments the home hub may be omitted and the intelligent lock and latch system may connect directly to the server 202. The home hub 204 may store, send and receive commands to and from the computing device 210 and the intelligent lock and latch 206 such as, for example, user notification of status of the lock, last operation performed, last operation performed with its remaining power if batteries have died, battery status of the intelligent lock and latch system, battery status of keypad, gate movement, temperature, humidity, or the like.

The intelligent lock and latch system 206 may store a function on its memory medium or microcontroller wherein if the intelligent lock and latch system is low on battery, then it will send a notification through the home hub 204, or directly to a computing device 210 wherein the intelligent lock and latch system will unlock itself as its last operation with its remaining power. The intelligent lock and latch system 206 may store the code, and the last action performed by the user. In certain embodiments, the intelligent lock and latch system may store information such as, for example, temperature, pressure, movement, keypad code, user's last known input, or the like, and send to home hub 204, or the computing device 210. The user through a computing device may lock or unlock the intelligent lock and latch system 10, may notify the user when the gate open or shut, and create user profile for one or more people such as family, friends, neighbors, service contractors, delivery people, or babysitters wherein each individual may have a unique code and/or profile set, and the user may be notified when the unique code is used. The user may turn on, off, or take away access from the other user.

Figure 5:
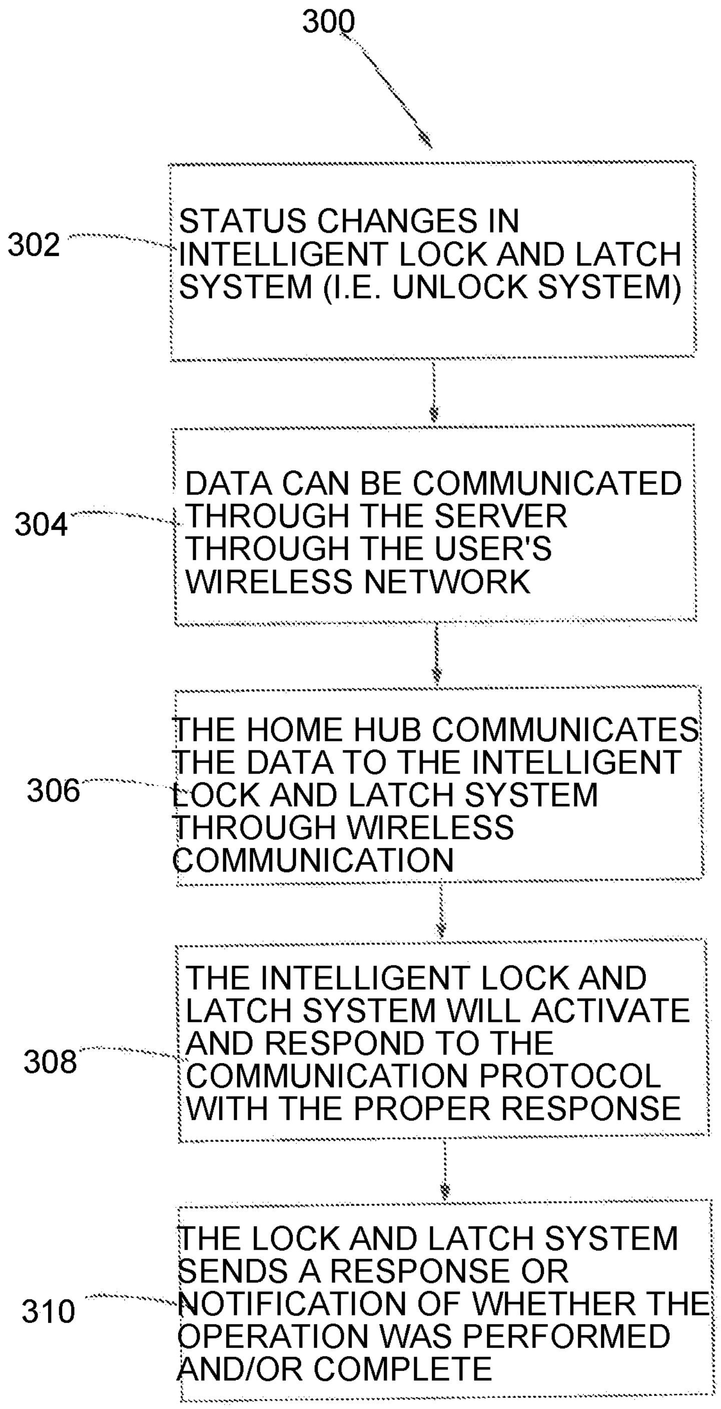
FIG. 5 is an example flow process of an intelligent lock and latch system in accordance with one or more embodiments.

Referring to FIG. 5, an example flow diagram of an intelligent lock and latch system is shown generally at 300. At step 302, the status changes in the intelligent lock and latch system or from the user's mobile device such as, for example, user send a command to unlock the system, to lock the system, status of gate whether it is open or closed, if there is movement at the gate, or the like. At step 304, the data may be communicated through the server through the user's wireless network (e.g., as discussed below in relation to wireless network 1514 of FIG. 15). At step 306, the home hub (e.g., as discussed below in relation to remote device 1526 of FIG. 15) communicates the data to the intelligent lock and latch system through the wireless communication modules. At step 308, the intelligent lock and latch system will activate and respond to the communication protocol with the proper response. At step 310, the intelligent lock and latch system may send a response or notification of whether the operation was performed and/or completed.

Figure 6:
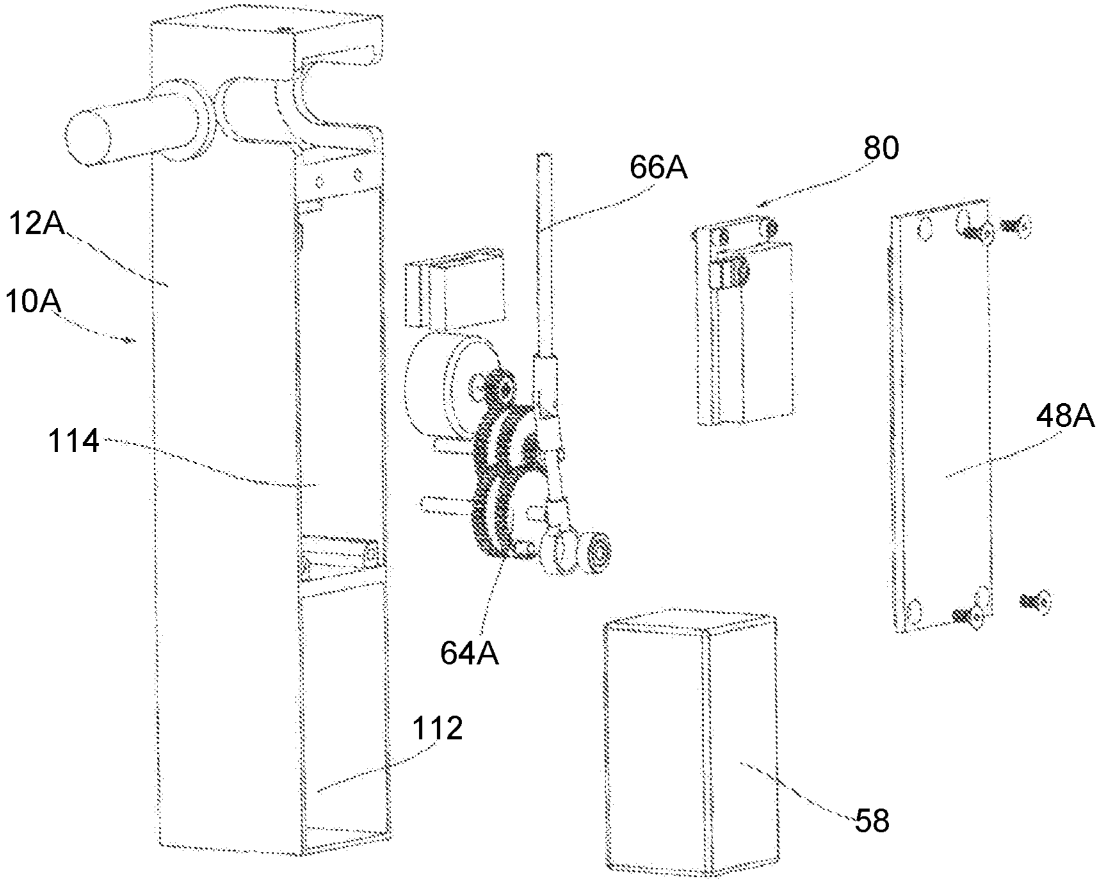
FIG. 6 is an exploded isometric view of another embodiment of an intelligent lock and latch system in accordance with one or more embodiments.

Referring to FIG. 6, another embodiment of an intelligent lock and latch system is shown generally at 10A. The intelligent lock and latch system 10A may comprise a housing 12A wherein the housing may have two cavities on the same side of the housing having a top cavity 114, and a bottom cavity 112. The top cavity may store the electrical system 80 (e.g., as discussed herein as electrical system 70), one or more gears 64A, the motor 62, and the locking pin 66A wherein the locking pin may be attached to the gears by an adapter 65 and a bearing 67. The bottom cavity 112 may store the batteries 58. A cover 48A may seal the cavities and keep fluids and dust out.

Figure 7:
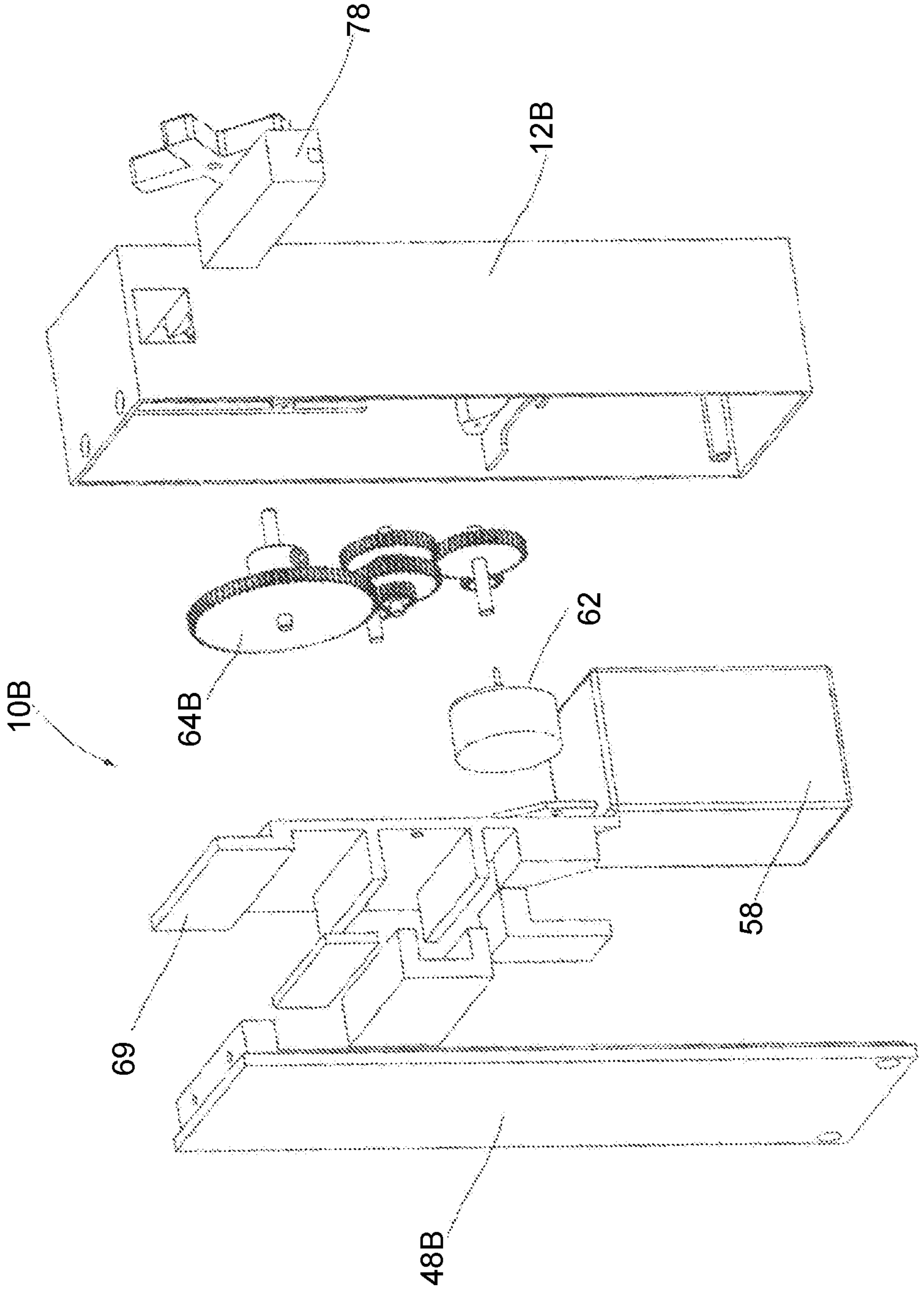
FIG. 7 is an exploded side view of another embodiment of an intelligent lock and latch system in accordance with one or more embodiments.
Figure 8:
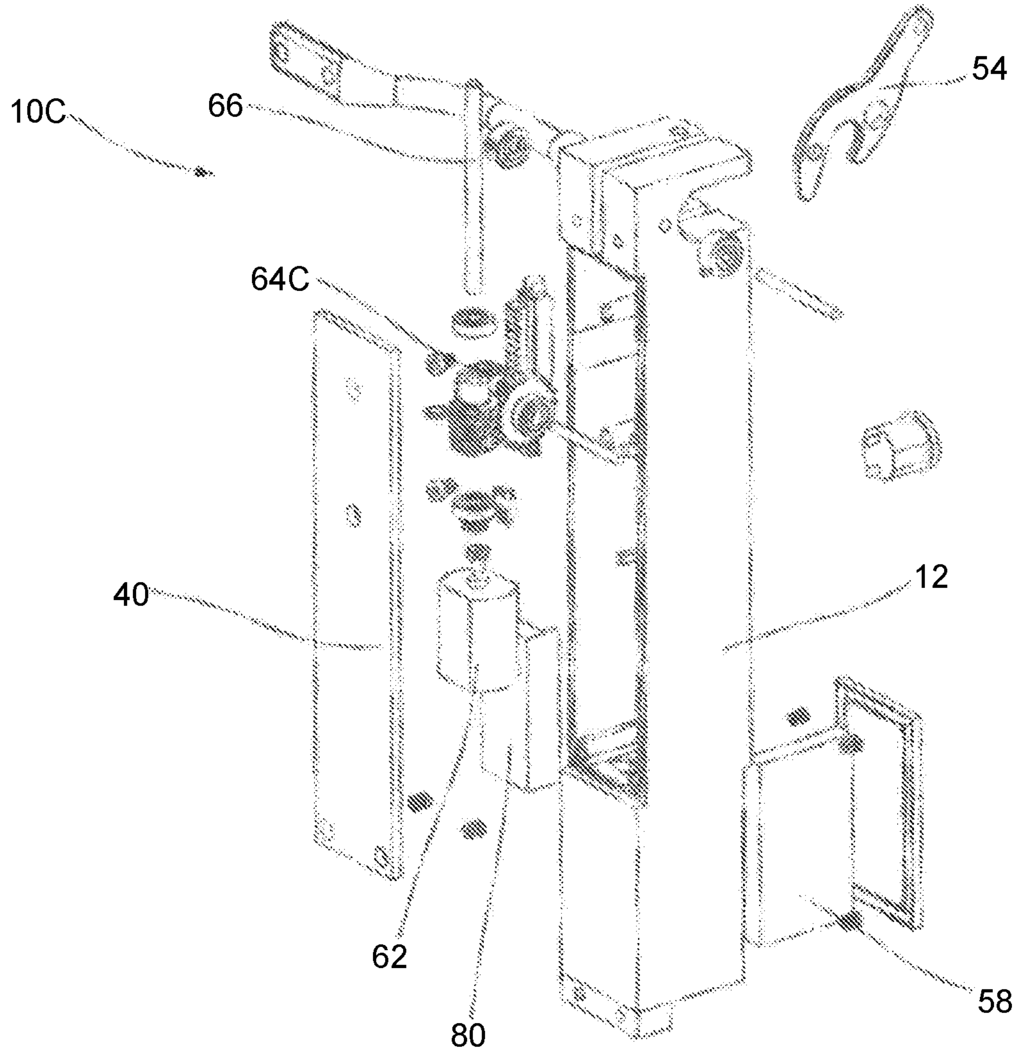
FIG. 8 is another exploded isometric view of another embodiment of an intelligent lock and latch system in accordance with one or more embodiments.

Referring to FIG. 7, another embodiment of an intelligent lock and latch system is shown generally at 10B. The intelligent lock and latch system 10B may comprise a housing 12B wherein the housing may have two cavities on the same side of the housing having a top cavity 114, and a bottom cavity 112. The top cavity may store the electrical system 70, one or more gears 64B, gear supports 69B, the motor 62, and the sliding lock 78 wherein the sliding lock may be connected to or touch the gears wherein the gears may slide the sliding lock in and out of the housing. The bottom cavity 112 may store the batteries 58.

Figure 12:
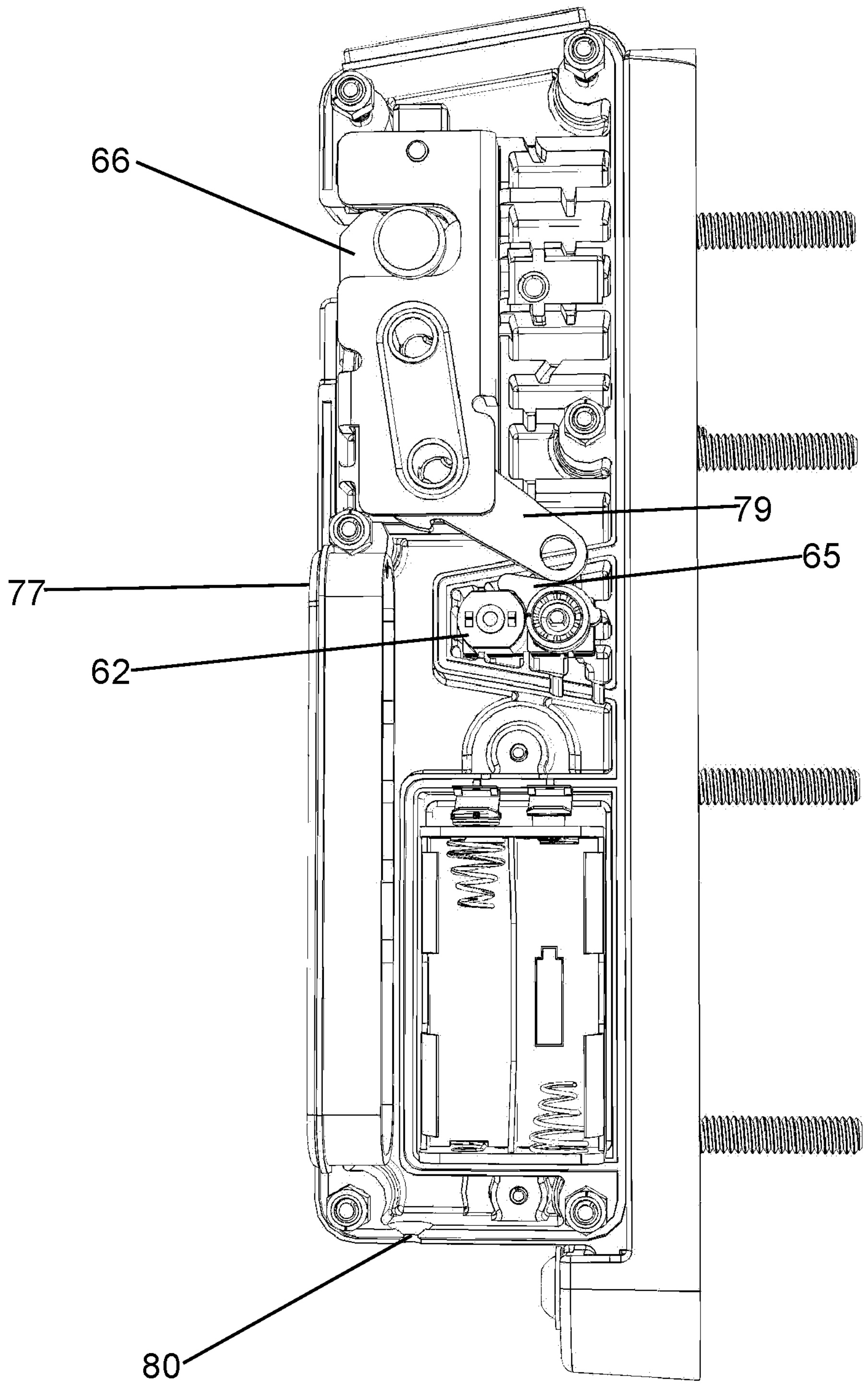
FIG. 12 is an interior side view of the embodiment of FIG. 9.

Referring to FIGS. 9 and 12, in particular embodiments, the latch system 10 may include a failsafe 77 to allow access to open a locked latch system 10 in the event of a power outage or other catastrophic failure of the latch system 10. The failsafe allows a failsafe pin (e.g., as discussed below in relation to failsafe pin 1402 of FIG. 14) to be inserted through the failsafe into the housing 12. The failsafe pin may operate a lever 79 to move the locking pin 66. The failsafe 77 and failsafe pin may be shaped to only allow a particularly shaped failsafe pin to operate like a key to only allow the user to operate the failsafe 77 of the latch system 10.

Figure 13:
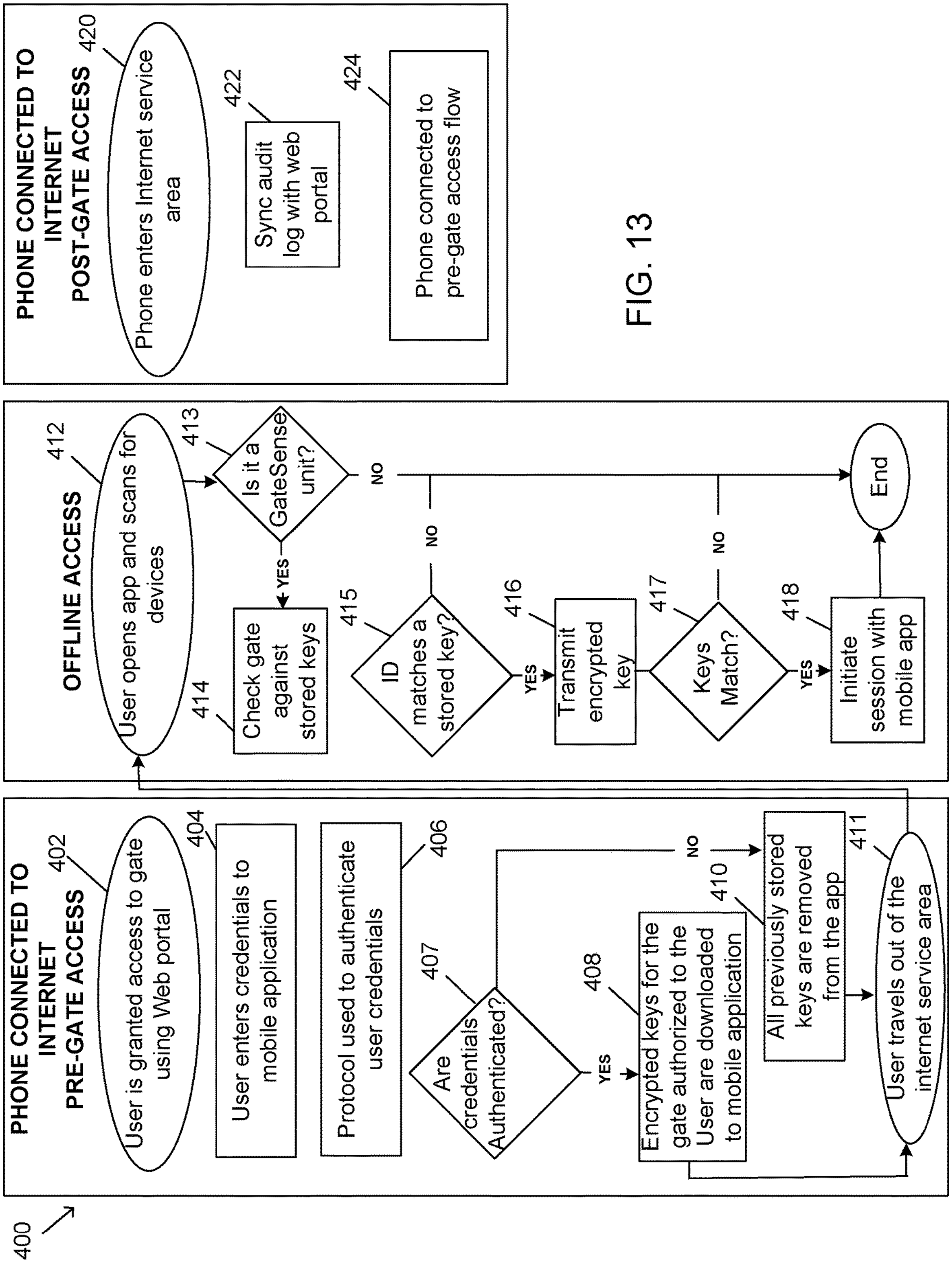
FIG. 13 a flow diagram of an intelligent lock and latch system and communicating remotely to a user in accordance with one or more embodiments.

Referring to FIG. 13, an example flow diagram of an intelligent lock and latch system is shown generally at 400. At step 402, a user is granted access to the gate lock via a web portal. At step 404, the user enters credentials to a mobile application on a mobile device such as a tablet or cell phone (e.g., as discussed below in relation to remote device 1526 of FIG. 15). At step 406, a protocol is used to authenticate the user's credentials. If the user's credentials are authenticated at step 407, at step 408 encrypted keys for the gates authorized to the user are downloaded to mobile application. If the user's credentials are not authenticated, at step 410, all previously stored keys are removed from the app. If the user is outside of an internet service area as in step 411, at step 412 the user opens the app and the user's mobile device is instructed to search for devices. If the user's mobile device detects a gate latch system as in step 413, at step 414 the gate ID of the gate latch system is checked against stored keys. If the ID matches a stored key as in step 415, an encrypted key is transmitted to the gate latch system. At step 416, the gate latch system checks the encrypted key for a match and initiates a session with the user's mobile app at step 418 if the keys match as in step 417. When the mobile device enters an internet service area again as in step 420, the audit log of the mobile app is synced with the web portal at step 422 and the mobile device is connected to the internet pre-gate access flow as in step 424.

The latch system 10 is designed to be impervious to the elements. The housing 12 may be essentially waterproof. In a particular embodiment, all electronics are potted to prevent shorting due to water, and the housing 12 includes a drain 80 to allow water that has entered the housing 12 to leave the housing 12 to prevent corrosion.

Figure 14:
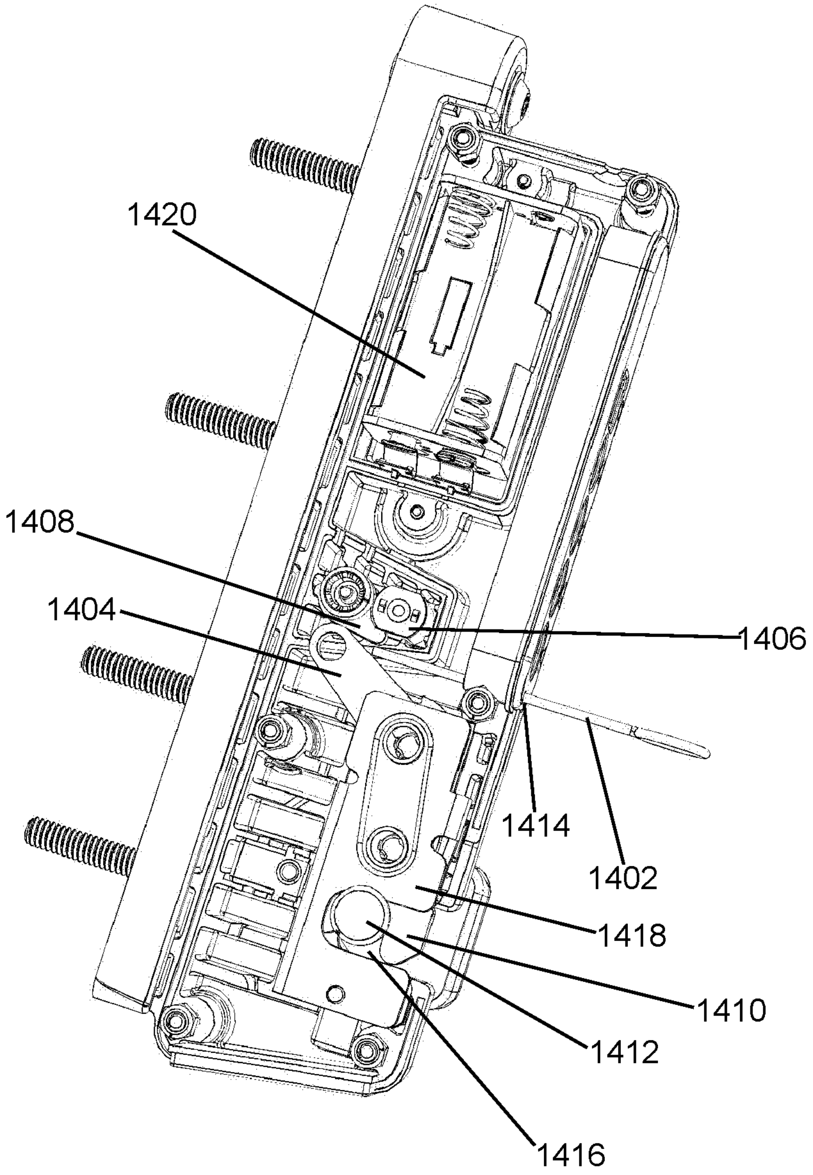
FIG. 14 is an isometric view of a partially assembled keypad embodiment of an intelligent lock and latch system in accordance with one or more embodiments.

Turning to FIG. 14, an isometric view of latch system assembly 1400 similar to that discussed above in relation to FIGS. 9-12 is exemplified, except that certain features have been removed and certain other features have been added for clarity. As can be seen, the side panel of latch system assembly 1400 is shown to be removed in order to reveal the locking and failsafe mechanisms as discussed herein, such as failsafe pin 1402 and its interaction with lever 1404 via failsafe 1414 as may be utilized, for example, during manual override operation that may be necessitated by a power outage or other electrical/mechanical failure of latch system 1400.

Under normal operating conditions that do not require a manual override (e.g., via remotely authenticated operating conditions as discussed above in relation to FIGS. 4, 5 and 13), motor 1406 may be actuated (e.g., via operational power provided by batteries located in battery compartment 1420) to rotate cam 1408 (e.g., in a clockwise direction) via a gear assembly (not shown) such that lever 1404 may be moved away from cam 1408. As a result, locking pin 1410 of latch assembly 1418 may disengage from latch pin 1412 thereby clearing receiving channel 1416 to allow latch pin 1412 to exit receiving channel 1416. In one embodiment, for example, latch pin 1412 may be connected to a gate (not shown), which may not be allowed to swing open so long as locking pin 1410 engages latch pin 1412 as shown. However, once a user has been authenticated to the system under normal operating conditions (e.g., wirelessly), the gate (not shown) may be allowed to swing open once locking pin 1410 has disengaged from latch pin 1412.

Abnormal operating conditions (e.g., as created by a power outage) may, for example, require a manual override to bypass operation of latch system 1400. In such instances, motor 1406 may be inoperative to rotate cam 1408 in a manner that disengages locking pin 1410 from latch pin 1412. Failsafe 1414 may then be used to manually override remote operation by allowing failsafe pin 1402 to be inserted via failsafe 1414 in order to move lever 1404 in a manner similar to that as discussed above in relation to the operation of motor 1406 and cam 1408 to disengage latch pin 1412 from locking pin 1410. In one embodiment, failsafe pin 1402 may exhibit an enhanced security measure (e.g., such as provided by a fire service key) such that failsafe pin 1402 may only be inserted via failsafe 1414 so long as the credentials (e.g., mechanical, or electrical keying) of failsafe pin 1402 matches, or otherwise can be authenticated to, those of failsafe 1414. As such, only those individuals with proper credentials may manually override latch system 1400 thereby avoiding the necessity for remote authentication during, for example, emergency operations.

Figure 15:
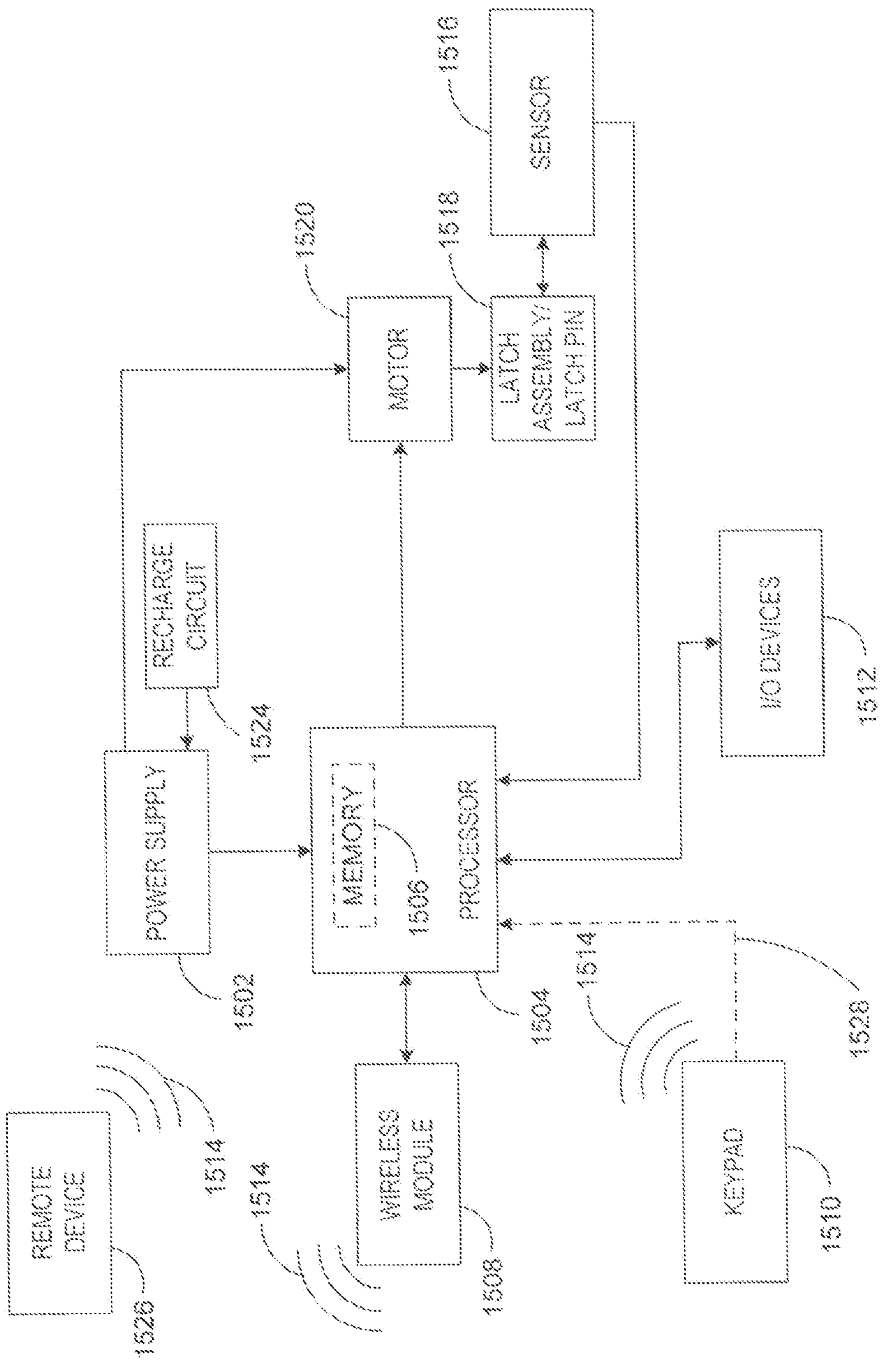
FIG. 15 is block diagram of an intelligent lock and latch system in accordance with one or more embodiments.

Turning to FIG. 15, a block diagram of latch system controller 1500 (e.g., as discussed herein in relation to electrical systems 70 and 80) is exemplified, which may be included within a latch system assembly (e.g., as discussed above in relation to latch system assembly 1400 of FIG. 14). Latch system controller 1500 may include power supply 1502 (e.g., as discussed above in relation to batteries 58 of FIGS. 2A and 2B), processor 1504 (e.g., as discussed above in relation to the microcontroller of FIG. 2A), keypad 1510 (e.g., keypad 100 as discussed above in relation to FIGS. 3 and 9), I/O devices 1512 (e.g., as discussed above in relation to the accelerometer, temperature sensor, humidity sensor, atmospheric sensor, and the like of FIG. 2A), recharge circuit 1524 (e.g., as discussed above in relation to solar panel 59 of FIG. 2A), motor 1520 (e.g., as discussed above in relation to motor 1406 of FIG. 14), latch assembly 1518 (e.g., as discussed above in relation to latch assembly 1418 and latch pin 1412 of FIG. 14) and sensor 1516 (e.g., as discussed above in relation to sensor 38 of FIG. 2A). Wireless module 1508 may provide wireless communications such as via RFID, Bluetooth, Wi-Fi or the like to support wireless communications via wireless network 1514 as discussed above in relation to FIGS. 4, 5 and 13 and optionally between keypad 1510 and collectively with remote device 1526 (e.g., a user's web portal, a user's mobile communications device, a user's hub, etc.) and processor 1504.

Processor 1504 may execute firmware/machine code stored within memory 1506 so as to control the operational states of a latch system as discussed herein. In addition, processor 1504 may capture historical data as to the operation of the latch system over time. For example, the latch system's history of openings/closings over a period of time, whether the latch system is reporting an open or closed state, identity of person(s) authenticated by the latch system, etc.

In one embodiment, power supply 1502 may include one or more rechargeable batteries. Recharge circuit 1524 may accept any of a solar signal, direct current (DC) signal, alternating current (AC) signal or magnetic signal and convert such signal as appropriate to recharge power supply 1502 to achieve adequate operational power levels (i.e., voltage and current) in order to operate the associated latch system. Processor 1504 may both receive operational power from power supply 1502 and may monitor such operational power to determine whether the operational characteristics (e.g., DC voltage magnitude and/or current capacity) of the operational power signal are adequate for operation.

As discussed in more detail below, latch assembly 1518 may interoperate with sensor 1516 to indicate whether a locking pin has been accepted within the receiving channel of latch assembly 1518. In one embodiment, sensor 1516 may be implemented as a Hall-effect sensor, which may be configured to measure the magnetic field that may be generated within the vicinity of sensor 1516 where such magnetic field may be altered by the various magnetic poles of latch assembly 1518 (e.g., latch assembly 1418 and latch pin 1412 of FIG. 14) operating within the vicinity of sensor 1516.

Figure 16:
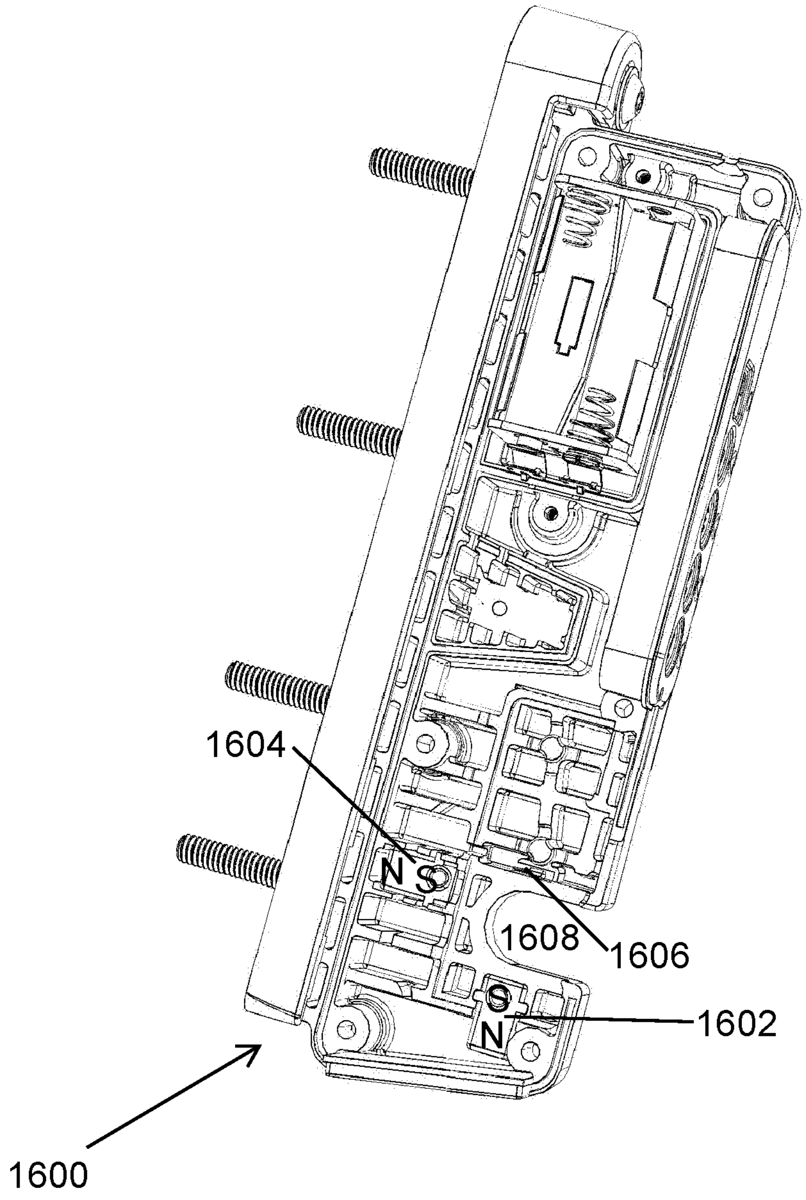
FIG. 16 is an isometric view of a partially assembled keypad embodiment of an intelligent lock and latch system in accordance with one or more embodiments.

Turning to FIG. 16, an isometric view of latch system assembly 1600 similar to that discussed above in relation to FIG. 14 is exemplified, except that certain features (e.g., latch assembly 1418 and latch pin 1412) have been removed for clarity. Features that remain include magnets 1602 and 1604 and Hall-effect sensor 1606. As shown, magnets 1602 and 1604 may be arranged at substantially non-zero angles relative to one another. In one embodiment, an angle existing between an axis arranged along the N-S orientation of a first magnet relative to an axis arranged along the N-S orientation of a second magnet may be selected to be a non-zero angle (e.g., a right angle). Further, each magnet may be arranged such that one of the two poles of magnets 1602 and 1604 may be positioned in closest proximity to receiving channel 1608. In one embodiment as shown, each of magnets 1602 and 1604 may be arranged such that the like pole (e.g., south pole) of each magnet 1602 and 1604 may be arranged to be closest in proximity to receiving channel 1608 and the other like pole (e.g., north pole) of each magnet 1602 and 1604 may be arranged to be furthest in proximity to receiving channel 1608. Furthermore, magnets 1602, 1604 and Hall-effect sensor 1606 may be arranged within cavities such that once a latch assembly (e.g., latch assembly 1418 of FIG. 14) is installed within the latch system assembly (e.g., latch system assembly 1400 of FIG. 14), magnets 1602, 1604 and Hall-effect sensor 1606 may exist below a plane formed by a bottom surface (not shown) of a latch assembly (e.g., latch assembly 1418 of FIG. 14).

In operation, the magnetic flux lines (not shown) produced by magnets 1602 and 1604 may be such that they may repel each other since the same magnetic pole (e.g., south pole) of each magnet is closest in proximity to receiving channel 1608. Accordingly, Hall-effect sensor 1606 may not indicate the presence of a magnetic field since the repulsion of the collective magnetic fields produced by magnets 1602 and 1604 may be such that the magnetic flux density present in the vicinity of Hall-effect sensor 1606 may be below the threshold magnitude required to "trip" Hall-effect sensor 1606. An unmagnetized, ferromagnetic object (e.g., as shown by the placement of latch assembly 1418 in FIG. 14) may be brought into proximity of magnets 1602 and 1604, thereby attracting at least a portion of the previously repelled magnetic flux lines to receiving channel 1608 (e.g., as discussed above in relation to receiving channel 1416 of FIG. 14), but still may not exceed the requisite magnetic flux density threshold required to cause Hall-effect sensor 1606 to "trip" (e.g., indicate the presence of a magnetic field).

In one embodiment, the magnetic flux density generated by magnets 1602 and 1604 may be selected to such a magnitude that only when an additional unmagnetized, ferromagnetic object (e.g., latch pin 1412 as discussed above in relation to FIG. 14) is brought into receiving channel 1608 may Hall-effect sensor 1606 indicate the presence of a magnetic field. Stated differently, for example, the combined presence of a latch pin (e.g., latch pin 1412 of FIG. 14) within receiving channel 1608 (e.g., receiving channel 1416 of FIG. 14) along with a latch assembly (e.g., latch assembly 1418 of FIG. 14) disposed in the vicinity of receiving channel 1608 may attract the requisite threshold of magnetic flux density needed to cause Hall-effect sensor 1606 to indicate the presence of a magnetic field and, therefore, indicate that the latch pin (e.g., latch pin 1412 of FIG. 14) of an associated ingress prevention mechanism (e.g., a door or a gate not shown) is in a verifiably closed position.

Operation of a latch assembly (e.g., latch assembly 1418 of FIG. 14) may be such that once a latch pin (e.g., latch pin 1412 of FIG. 14) of an associated ingress prevention mechanism (e.g., a door or a gate not shown) is in a closed position (e.g., as verified magnetically as discussed above), a locking pin (e.g., locking pin 1410 of FIG. 14) may automatically (e.g., mechanically) engage the latch pin (e.g., as shown in FIG. 14) without the necessity of operational power (e.g., as discussed above in relation to power supply 1502 of FIG. 15). As such, an associated ingress prevention mechanism (e.g., a door or gate) may be verifiably locked in a closed position whether or not operational power is available (e.g., whether power supply 1502 is adequate to operate motor 1520 of FIG. 15).

In one embodiment, Hall-effect sensor 1606 may indicate the presence of a magnetic field when a threshold magnetic flux density (e.g., approximately 40 gauss) may be measured by Hall-effect sensor 1606. Turning back to FIG. 15, once sensor 1516 (e.g., Hall-effect sensor 1606 of FIG. 16) measures a threshold magnitude of magnetic flux density (e.g., approximately 40 gauss), sensor 1516 may so indicate the presence of a magnetic field by issuing a signal (e.g., a logic "1" signal) to processor 1504 that may be indicative of a locked condition. As discussed above, however, the presence of a spatially fixed ferromagnetic object (e.g., latch assembly 1418 of FIG. 14) within the proximity of receiving channel 1608 may provide a magnetic pole the existence of which may not attract enough magnetic flux to sensor 1606 so as to cause sensor 1606 to indicate the presence of a latch pin (e.g., latch pin 1412 of FIG. 14). Accordingly, a magnitude of the magnetic flux density may be selected such that a second, spatially variable ferromagnetic object (e.g., latch pin 1412 of FIG. 14) may be required in the proximity of receiving channel 1608 in order to attract enough magnetic flux to sensor 1606 so as to cause sensor 1606 to indicate the presence of a latch pin (e.g., latch pin 1412 of FIG. 14) only when the associated ingress prevention mechanism (e.g. gate or door) is in a verifiable closed position.

In order to achieve the requisite magnitude of magnetic flux density, more than one magnet (e.g., magnets 1602 and 1604) may be disposed at a non-zero angle (e.g., a right angle) whereby the N-S axis of magnet 1602 relative to the N-S axis of magnetic 1604 are approximately orthogonal and further that like poles (e.g., south poles) of both magnets 1602 and 1604 may be arranged in closest proximity to receiving channel 1608 as shown. It should be noted that the magnetic pole orientation of magnets 1602 and 1604 as shown in FIG. 16 may be required to generate the requisite number of magnetic flux lines flowing in the proper direction (e.g., looping in a direction tending toward receiving channel 1608 from north pole to south pole) for proper operation. Stated differently, for example, reversal of the magnetic pole orientation of magnets 1602 and 1604 from that shown in FIG. 16 (e.g., with respective north poles of magnets 1602 and 1604 arranged in closest proximity to receiving channel 1608) may orient the concomitant direction of magnetic flux lines away from receiving channel 1608, which may then cause erroneous operation.

It is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter may be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A latch system, comprising:

a latch assembly configured to include a receiving channel;

a latch pin removably disposed within the receiving channel, wherein the latch pin is coupled to a gate configured as an ingress prevention mechanism;

at least two magnets disposed at non-zero angles relative to each other and configured to generate a magnetic field in proximity to the latch assembly, the latch pin and the receiving channel; and a sensor configured to measure a magnitude of the magnetic field, wherein the magnitude exceeds a threshold value only when the latch pin is disposed within the receiving channel.

2. The latch system of claim 1, wherein the at least two magnets are disposed at right angles relative to each other.

3. The latch system of claim 2, wherein a like pole of each of the at least two magnets is arranged in closest proximity to the receiving channel.

4. The latch system of claim 3, wherein the like pole is a south pole.

5. The latch system of claim 1, further comprising:

a processor configured to receive a signal from the sensor, the signal being indicative of the measured magnitude exceeding the threshold value; and a wireless module coupled to the processor and configured to transmit the signal to indicate a locked condition of the ingress prevention mechanism.

6. A method of operating a latch system, comprising:

disposing a first and second magnet in proximity to a receiving channel of a latch assembly, wherein the first and second magnets are arranged at non-zero angles relative to each other;

attaching a latch pin to a gate, the gate being configured to function as an ingress prevention mechanism;

moving the latch pin to a first location inside the receiving channel;

moving the latch pin to a second location outside the receiving channel; and measuring a magnetic field in proximity to the receiving channel, wherein the measured magnetic field exceeds a threshold value only when the latch pin is in the first location.

7. The method of claim 6, wherein the first and second magnets are disposed at right angles relative to each other.

8. The method of claim 7, wherein like poles of the first and second magnets are arranged in closest proximity to the receiving channel.

9. The method of claim 8, wherein the like poles are south poles.

10. The method of claim 6, further comprising:

providing an indication of the first location; and wirelessly communicating the indication.

11. A latch system, comprising:

a latch assembly configured to include a receiving channel;

a latch pin removably disposed within the receiving channel, wherein the latch pin is coupled to a gate configured as an ingress prevention mechanism;

at least two magnets disposed at non-zero angles relative to each other and configured to generate a magnetic field in proximity to the latch assembly, the latch pin and the receiving channel;

a sensor configured to measure a magnitude of the magnetic field, wherein the magnitude exceeds a threshold value only when the latch pin is disposed within the receiving channel;

a processor configured to receive a signal from the sensor, the signal indicating that the measured magnitude exceeds the threshold value; and a wireless module coupled to the processor and configured to transmit the signal.

12. The latch system of claim 11, wherein the at least two magnets are disposed at right angles relative to each other.

13. The latch system of claim 12, wherein a like pole of each of the at least two magnets is arranged in closest proximity to the receiving channel.

14. The latch system of claim 13, wherein the like pole is a south pole.

* * * * *